(12) United States Patent
Miyazaki

(10) Patent No.: US 6,760,064 B1
(45) Date of Patent: Jul. 6, 2004

(54) CAMERA

(75) Inventor: Takao Miyazaki, Asaka (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 787 days.

(21) Appl. No.: 09/714,978

(22) Filed: Nov. 20, 2000

(30) Foreign Application Priority Data

Nov. 19, 1999 (JP) .......................................... 11-329994

(51) Int. Cl.$^7$ ............................................. H04N 5/225
(52) U.S. Cl. ..................................... 348/220.1; 348/64
(58) Field of Search ............................... 348/220.1, 64, 348/207.99; 358/909.1, 906; 396/429, 310, 319, 320, 321

(56) References Cited

U.S. PATENT DOCUMENTS

| | | | |
|---|---|---|---|
| 4,714,962 A | * 12/1987 | Levine | 348/64 |
| 5,555,044 A | * 9/1996 | Gandola et al. | 396/319 |
| 5,845,166 A | * 12/1998 | Fellegara et al. | 348/64 |
| 5,933,585 A | * 8/1999 | Wagensonner et al. | 358/1.16 |
| 5,966,553 A | * 10/1999 | Nishitani et al. | 396/429 |
| 6,104,885 A | * 8/2000 | McIntyre et al. | 396/319 |
| 6,400,909 B1 | * 6/2002 | Kimura | 396/312 |

FOREIGN PATENT DOCUMENTS

| | | |
|---|---|---|
| JP | 8129232 | 5/1996 |
| JP | 8194246 | 7/1996 |
| JP | 91858 | 1/1997 |
| JP | 10104736 | 4/1998 |

* cited by examiner

*Primary Examiner*—Aung Moe
(74) *Attorney, Agent, or Firm*—Birch, Stewart, Kolasch & Birch, LLP

(57) ABSTRACT

A camera is provided in which an electronically picked up image is exposed on a silver halide roll film and higher degree of freedom in print size and the cost down of the additional printing can be attained. An image-pickup signal outputted from a CCD is converted into image data through a given signal processing, and it is stored in a main memory or an external memory. A CPU drives and controls a line head of an optical printer based on the inputted image data, and it generates by exposure an image on a photographic film. A panorama picture or the like can be recorded with an arbitrary length in the longitudinal direction of the photographic film. Furthermore, by using the line head, additional information such as the date and time of photographing or the conditions of photographing is recorded in an area between frames of the photographic film. At this moment, the distance between frames is changed according to the amount of the additional information to be written in. The CPU of the camera keeps track of the remaining film length of the photographic film, and it performs the control of rewinding the film in the case where the remaining film length is shorter than a given length.

18 Claims, 23 Drawing Sheets

F I G. 1
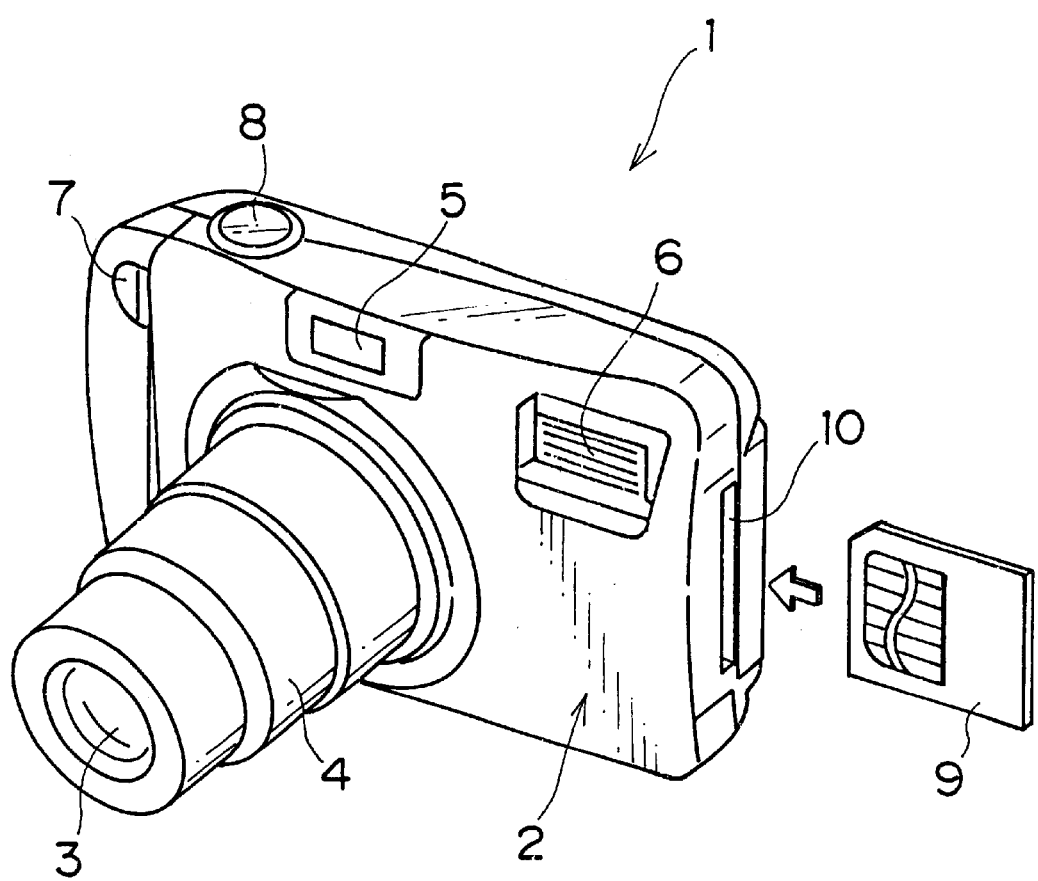

F I G. 6
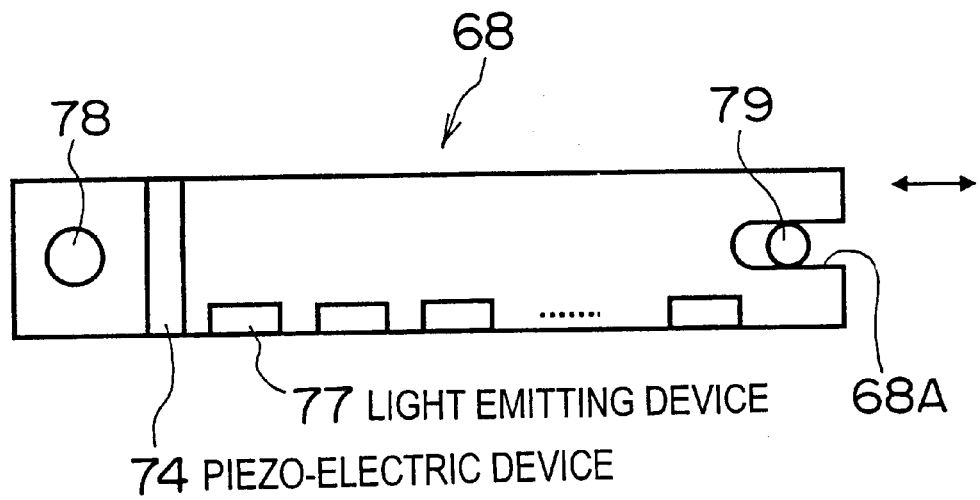
F I G. 7
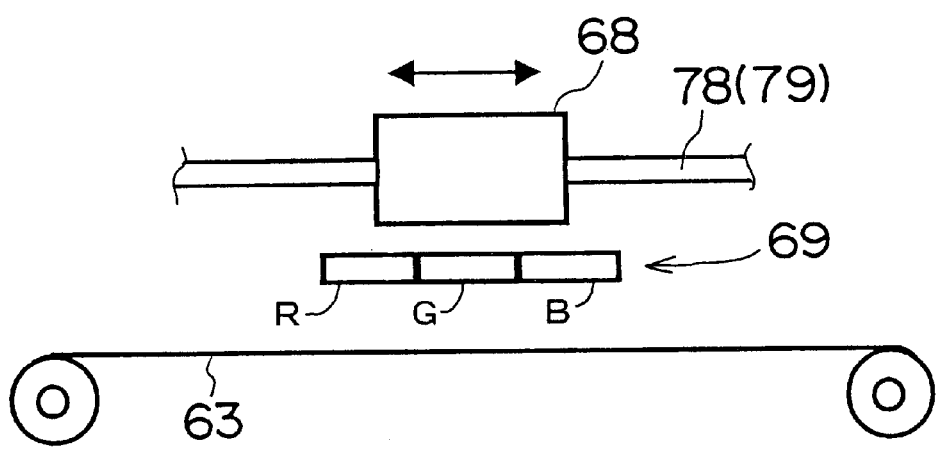

F I G. 1 2
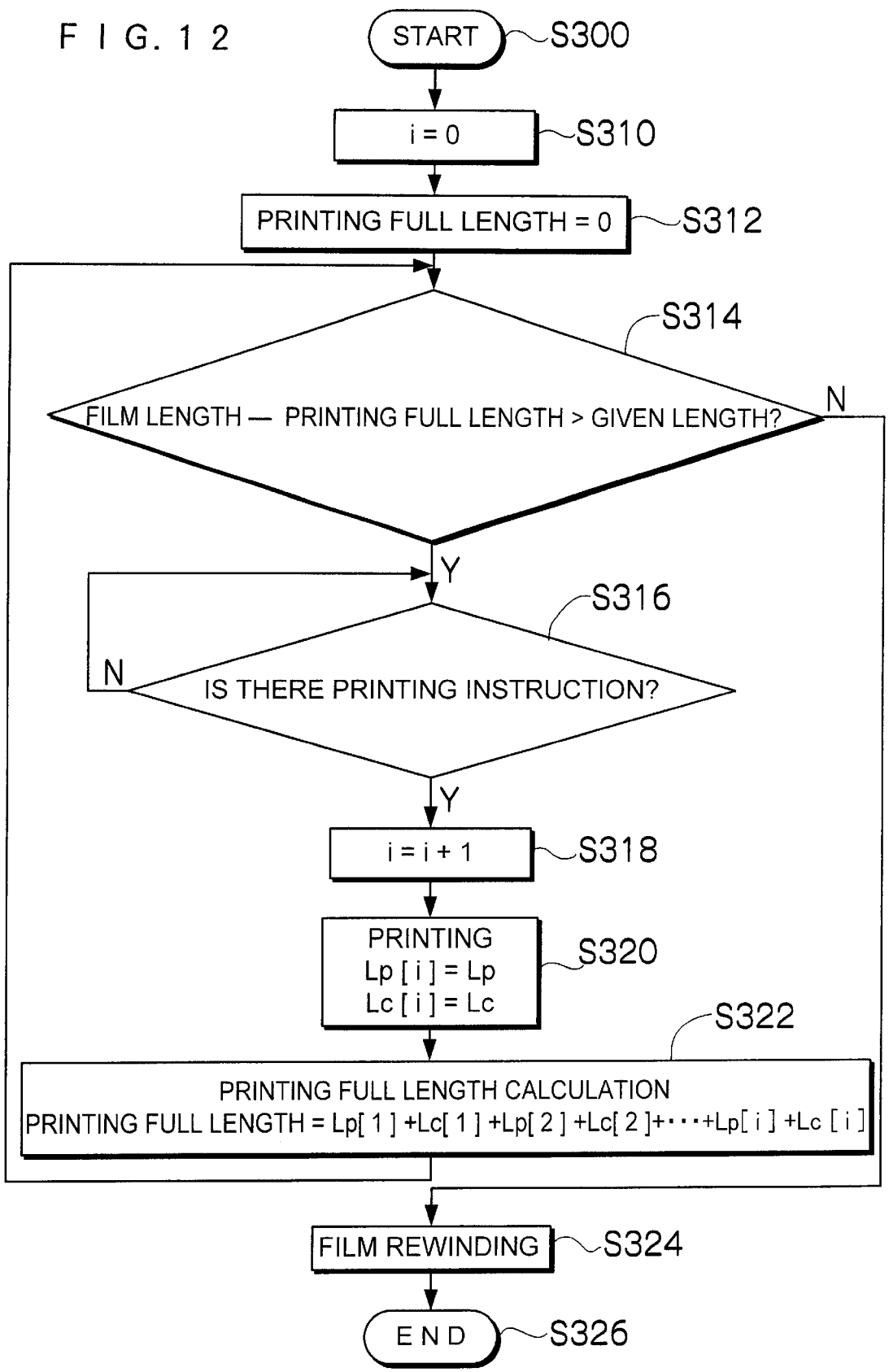

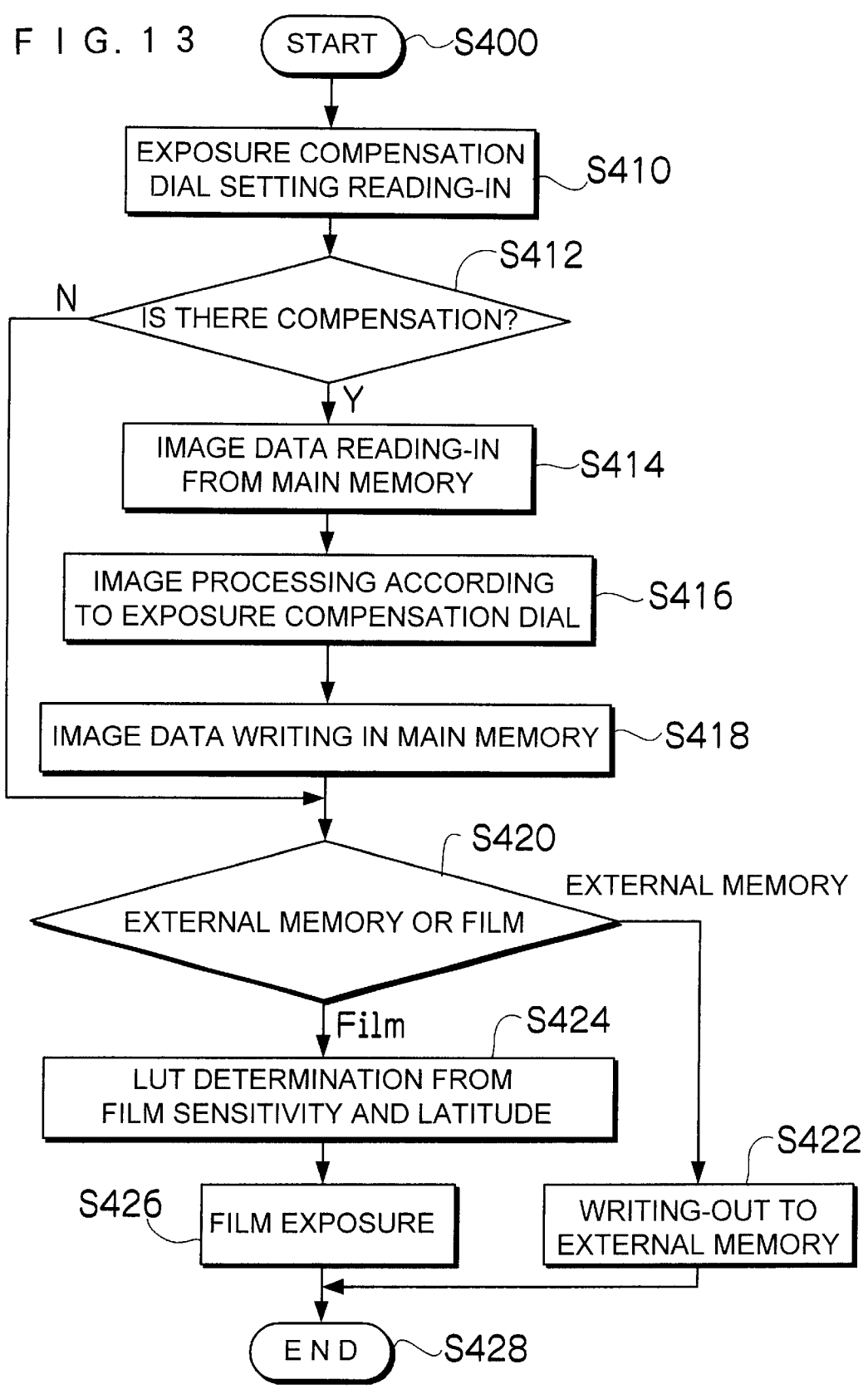

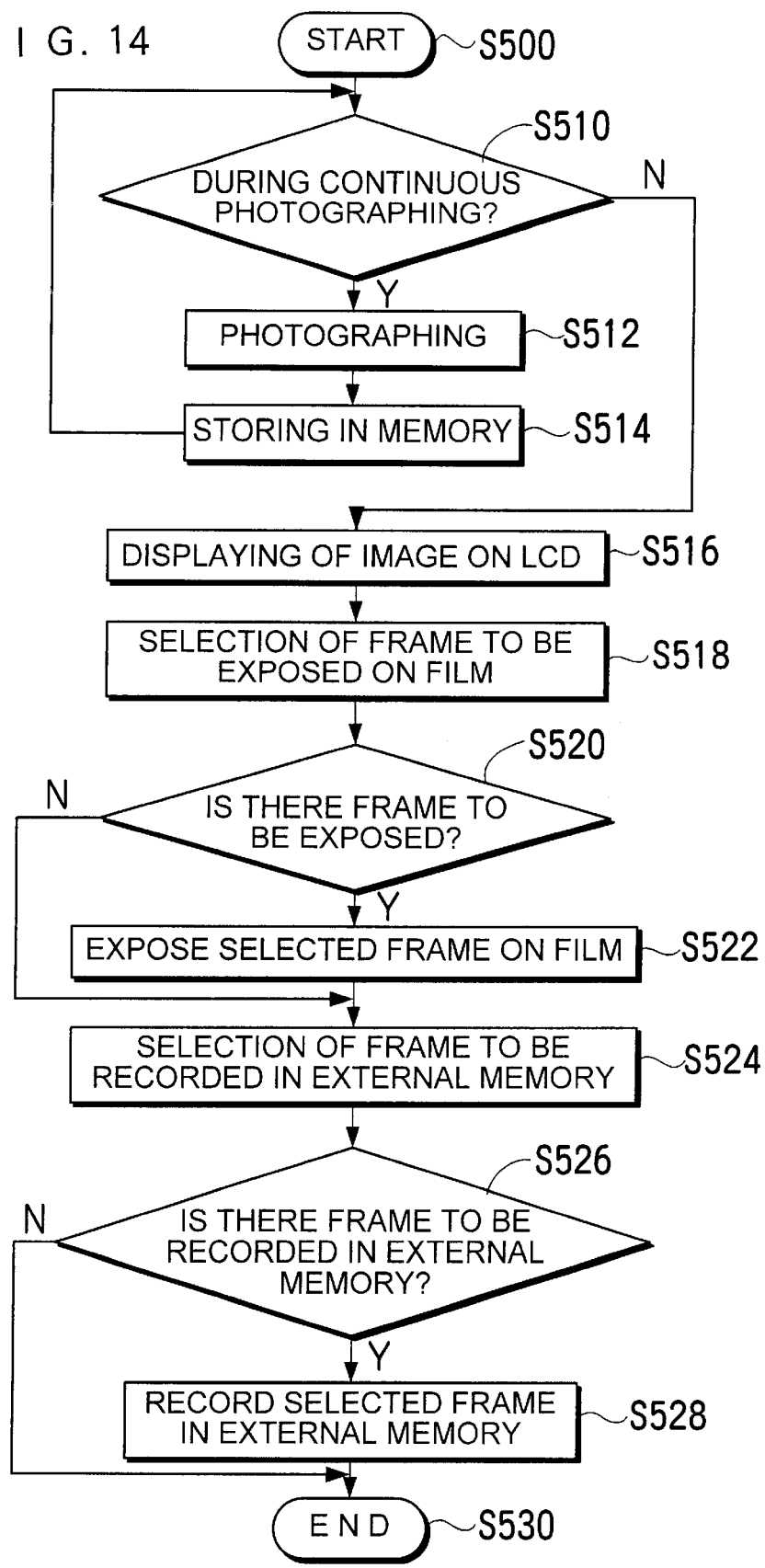

F I G. 1 5
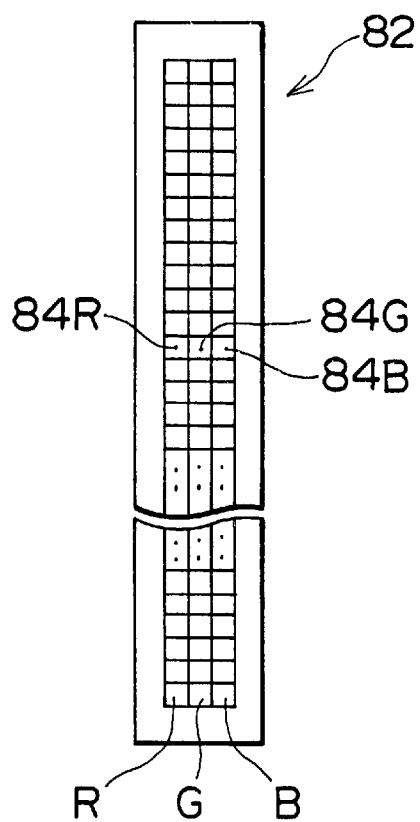
F I G. 1 6
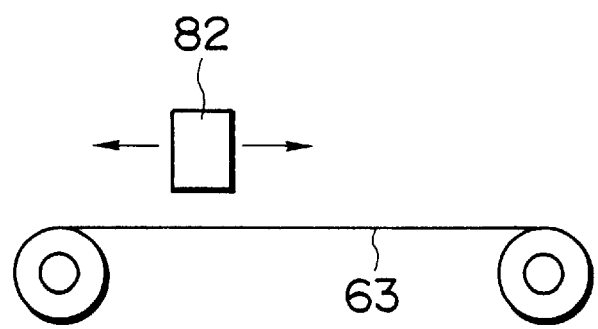

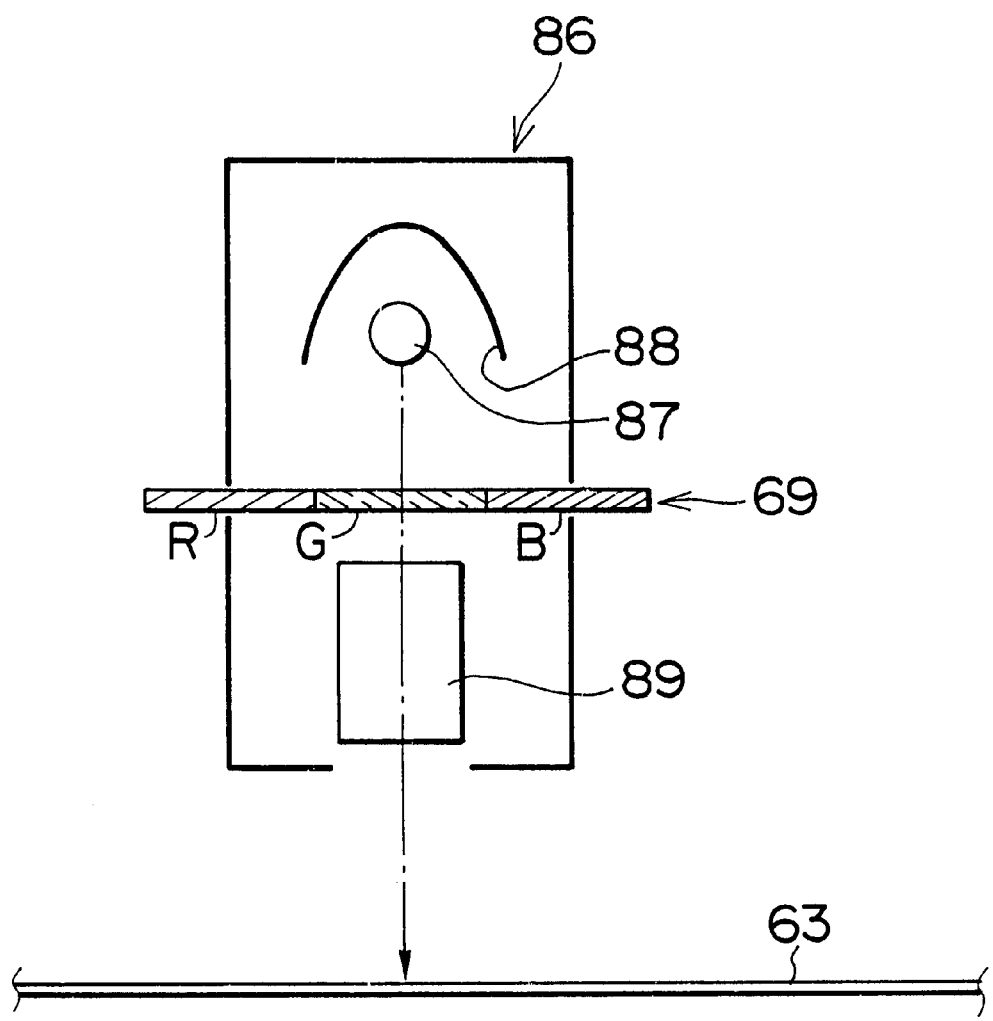
F I G. 18

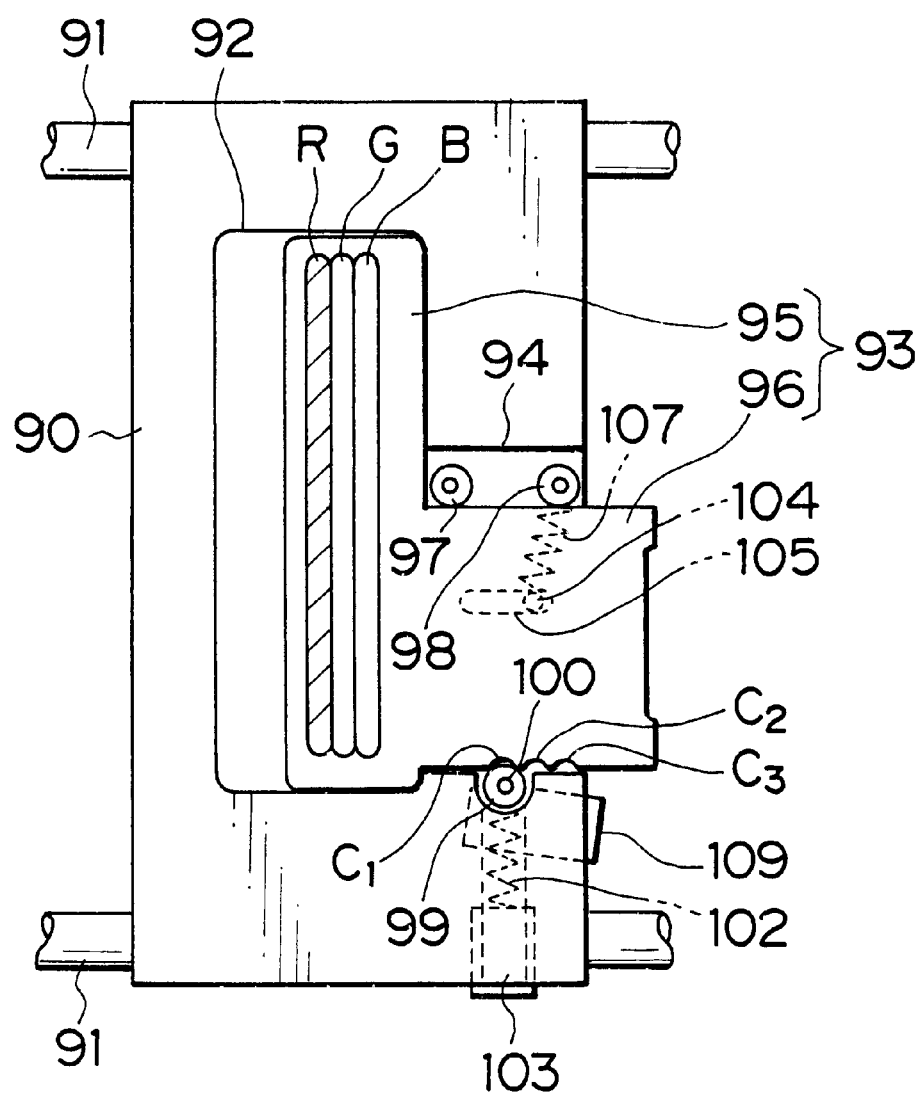
F I G. 19

F I G. 2 0
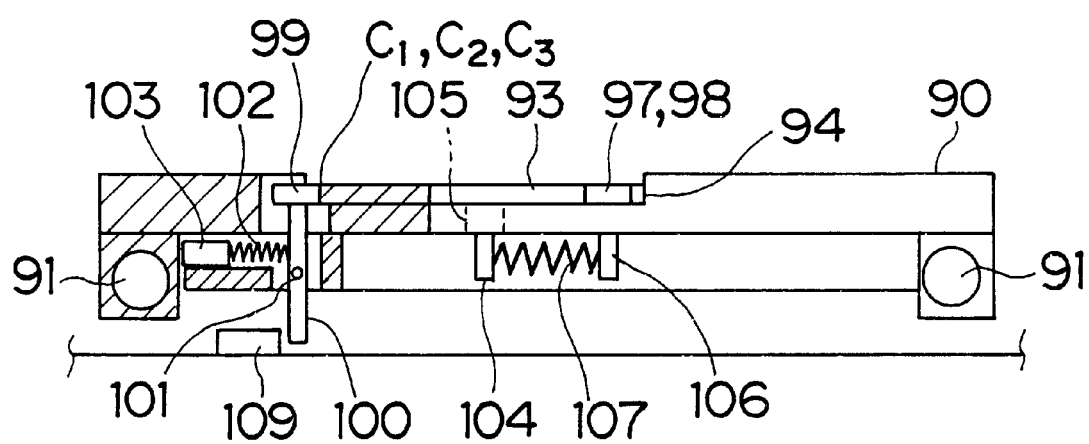

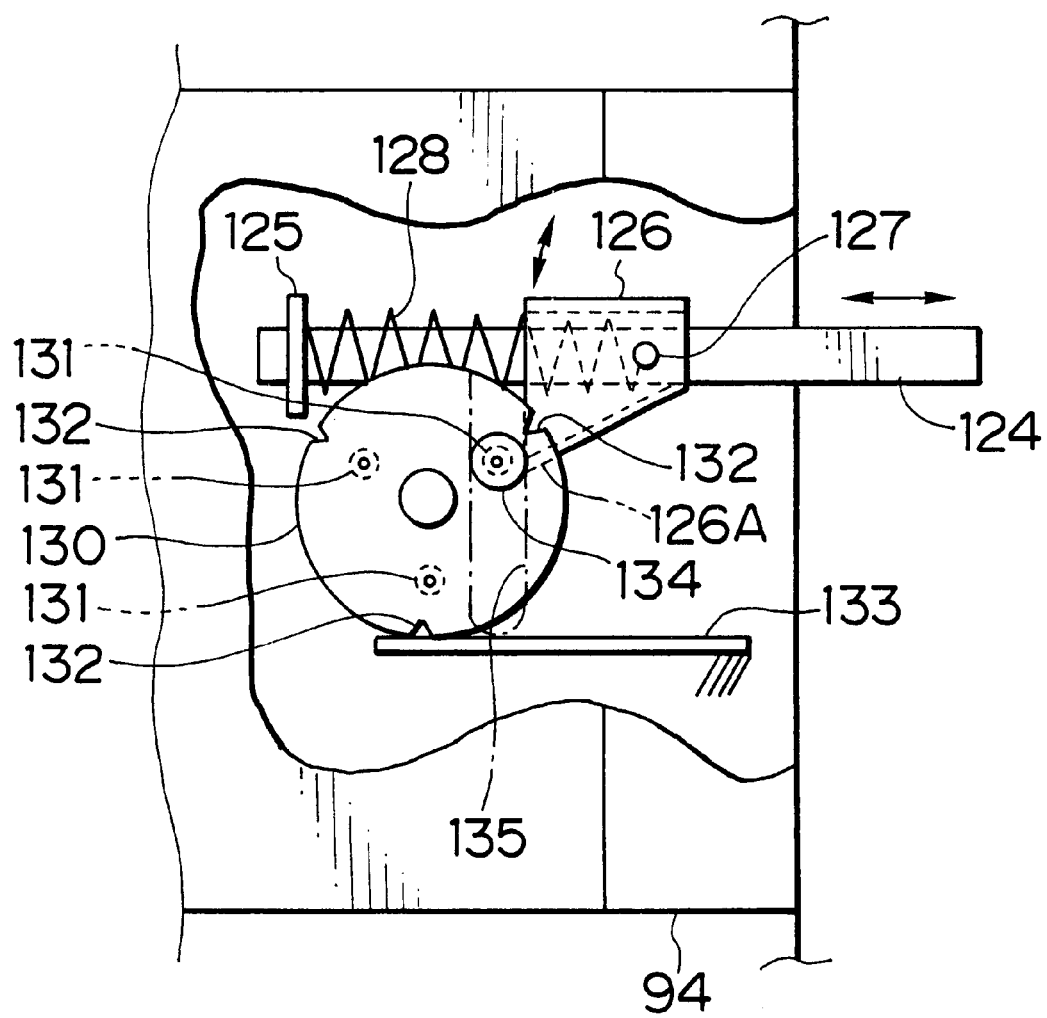
F I G. 24

CAMERA

BACKGROUND OF THE INVENTION

1. Field of the Invention

The present invention relates to a camera, and more particularly, relates to an electronic camera with a film recorder for converting an optical image into an electric signal by using an image-pickup device and for recording image information on a photographic film based on resulting image-pickup data.

2. Description of Related Art

Japanese Patent Application Laid-Open No. 10-104736 or Japanese Patent Application Laid-Open No. 8-194246 discloses a camera (complex camera) having both of an electronic image-pickup apparatus for picking up an object image by using an image-pickup device such as a CCD and a silver halide film photographic apparatus for optically recording an object image on a silver halide film. Such a complex camera displays an image picked up by an image-pickup device on a monitor (electronic view finder or the like), and on the other hand, it generates by exposure an object image put in from a photographic lens directly on a silver halide film.

On the other hand, Japanese Patent Application Laid-Open No. 8-129232 discloses a film recorder in which a light emitting device of a light emitting part is controlled based on a video signal to generate an image of the video signal on a photographic film, and Japanese Patent Application Laid-Open No. 9-1858 discloses a printer in which a video image is printed on a color film by a printer head having a fluorescent light emitting tube and an RGB three color switching filter.

Furthermore, in Japanese Patent Application No. 10-127117, the present applicant has proposed a digital still camera with a built-in optical filter for giving exposure to an instant film.

However, conventional complex cameras cannot generate an electrically picked up image on a photographic film. Furthermore, in the case of a camera for recording an electrically picked up image on an instant film, the instant film has a shape of a fixed form, and therefore, there is no degree of freedom in print size, and the printing of a plurality of sheets of printing (additional printing) is expensive.

SUMMARY OF THE INVENTION

The present invention is made in view of such a situation, and it is an object to provide a camera in which an electronically picked up image is generated on a silver halide film photographic film and higher degree of freedom in print size and cost down of additional printing can be attained.

In order to attain the above described object, the present invention is directed to a camera comprising: an image sensor which picks up an object image and outputs an image-pickup signal; a storage device which stores image data; an optical printer which exposes a photographic film based on image data read out of the storage device, and which records an image on the photographic film; and a carrying device which carries the photographic film.

The image-pickup signal outputted from the image sensor is converted into image data through a given signal processing. This image data can be stored in a storage device. Based on the image data read out of the above described storage device, an optical printer is driven and controlled, and by the light emitted by the optical printer, an image is recorded on a photographic film (hereafter, recording of information on a photographic film by an optical printer is called "printing"). The carrying device carries a photographic film at the time of printing by an optical printer or after the finish of printing.

According to the present invention, an electronically picked up image can be exposed on a photographic film through an image sensor, and higher degree of freedom in print size and the cost down of the additional printing can be attained. The optical printer is made of an optical head having a light emitting part and a driving device which gives relative speed to the above described optical head and photographic film, but the film carrying device can also serve as the driving device.

The storage device may be an external memory that is removably attached to the camera body, and it is also possible to be a memory contained in the camera. When using an external memory, it is possible to print an image obtained by an image-pickup device other than the above described camera, and the image, drawing, and document or the like edited with a personal computer or the like on a photographic film by the above described camera.

It is possible to use a silver halide roll film wound up and contained in a shielding container in the form of a roll such as a 35 mm film or a 24 mm film, as the photographic film. In the case of a camera using a roll film, an embodiment is preferable, which is configured so that the image recording length can be changed as for the longitudinal direction of the film. According to such an embodiment, a panorama picture or the like can also be recorded with free length.

Furthermore, an embodiment is also preferable, which is configured so that additional information can be recorded in an area between frames of a roll film by using the above described optical printer. Not only character information such as the date and time of photographing or the conditions of photographing but also a pattern and a banner image or the like may be additional information. Furthermore, in the case where additional information is recorded between frames of a film, an embodiment is preferable, which has an additional function of changing the distance between frames according to the amount of information thereof.

There is an embodiment to which a line printer having a line head made by arranging light emitting parts linearly in one line or a plurality of lines along the main scanning direction at the time of printing is applied as the above described optical printer. In this case, printing with a higher resolution becomes possible by adding a moving device (main scanning direction moving device) which moves the above described line head in the main scanning direction.

According to another embodiment of the present invention, the above described optical printer to be mounted on a camera is made of a white light source and a color separation filter. In such an embodiment, furthermore, there is an embodiment that has an additional mechanism for moving the above described color separation filter in the carrying direction of the photographic film, and moves the color separation filter relative to the head by the above described mechanism to perform the switching of the filter.

It is possible to apply an optical printer having a print head made of a light emitting device and a refraction factor distribution type lens array (selfock lens array) as one embodiment of the optical printer.

In the camera of the present invention, there is an embodiment that has an additional control part for controlling the above described film carrying device, so that it may keep track of the remaining film length of the above described photographic film, and that it may rewind the film in the case where the remaining film length is shorter than a give length. Furthermore, in the camera of the present invention, there is an embodiment that has an additional communication device and is configured so that it may perform transmission and reception of data with an external apparatus. Furthermore, in the camera of the present invention, an embodiment is also preferable, which has an additional exposure compensation instructing device and is configured so that the exposure compensation may be effective at least in one case among the time of photographing, the time of writing of image data in the above described storage device, and the time of recording on the above described photographic film.

Furthermore, a camera according to another embodiment of the present invention further comprises an information acquiring device which acquires sensitivity information of a photographic film and an exposure adjusting device which adjusts the exposure by the above described optical printer according to the sensitivity information obtained by the above described information acquiring device.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is an illustration of a camera according to an embodiment of the present invention;

FIG. 6 is a side view showing one example of the line head in FIG. 4;

FIG. 7 is a schematic view showing the relation between a filter and the line head in FIG. 4;

FIG. 12 is a flow chart of the control for keeping track of the recording length of the film in the camera of the present example;

FIG. 13 is a flow chart showing the control procedure of the brightness compensation in the camera of the present example;

FIG. 14 is flow chart showing the procedure of the image recording control at the time of continuous photographing in the camera of the example;

FIG. 15 is a figure showing another example of the line head;

FIG. 16 is a schematic view showing an exposing method by the line head shown in FIG. 15;

FIG. 18 is a figure showing still another example of the line head;

FIG. 19 is a plan view showing one example of a filter switching mechanism;

FIG. 20 is a side view including a partial cross section of the filter switching mechanism shown in FIG. 19;

FIG. 24 is an enlarged view of the main part of the filter switching mechanism shown in FIG. 23.

DETAILED DESCRIPTION OF THE PREFERRED EMBODIMENT

Figure 2:
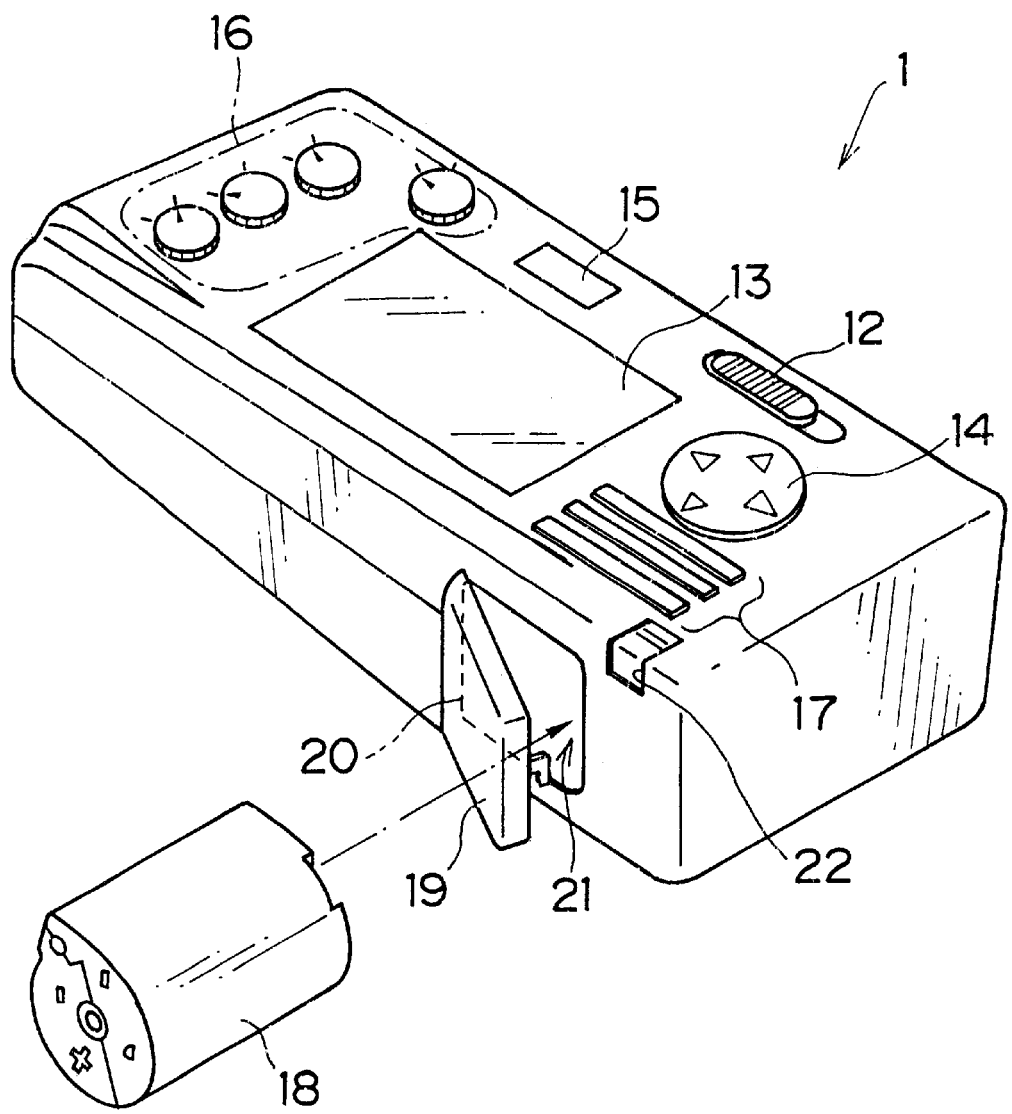
FIG. 2 is an illustration on the rear side of the camera shown in FIG. 1.

The preferred embodiments of the camera according to the present invention will be described below in detail according to accompanying drawings.

FIG. 1 is an illustration of a camera according to an embodiment of the present invention. On the front surface of a main body 2 of this camera 1, a camera cone 4 of a photographic lens 3 with a zoom function, a finder window 5, a strobe light emitting part 6, and a self timer lamp 7 or the like are provided. Behind the photographic lens 3, a CCD image sensor (hereafter, referred to simply as a CCD) as an image-pickup device is arranged.

Furthermore, on the upper surface of the main body 2, a shutter button 8 is provided. The shutter button 8 is configured to be a two-stage type, and in the state of "half-pressing" where the shutter button 8 is lightly pressed and stopped, the automatic focusing (AF) and automatic exposure control (AE) are actuated to lock the AF and AE, and in the state of "full-pressing" where the shutter button 8 is further pressed from "half-pressing", the photographing is performed. Herein, the AF and AE are controlled based on an image-pickup signal obtained from the above described CCD. Of course, it is also possible to use a range sensor or the like made of the well known photometry sensor or AF light projecting/light intercepting sensor.

On the side of the main body 2, a card slot 10 into which a memory card 9 is inserted is provided. For the memory card 9, for example, smart media are used. The embodiment of the recording medium is not limited to this, and it is possible to use various removable media such as a PC card, a compact flash, a magnetic disk, an optical disk, a magneto-optical disk, a memory stick, and a signal processing device and an interface corresponding to the medium to be used is applied.

As shown in FIG. 2, at the rear of the camera 1, a main power supply switch 12, a liquid crystal display part 13, a cross button 14, a finder ocular part 15, various operating knobs 16, and operating keys 17 or the like are provided. On the liquid crystal display part 13, an image picked up by the CCD is displayed, and in the meantime, a reproduction image read out of the memory card 9 is displayed. Furthermore, it is also possible to display, on the liquid crystal display part 13, the information on the function of the camera such as the menu and selection items necessary for the camera mode setting and other various settings and selecting operations, the display of the remaining storage capacity of the memory card 9, the number of images that can be photographed, the frame number of the reproduction image, the remaining capacity of the battery. As a display device, not only a liquid crystal display (LCD) but also an electro-luminescence (EL) and other display devices can be applied.

The cross button 14 is a button in which by pressing any one of the upper, lower, left, and right edge parts, the cross button 14 can be tilted to input the instruction of the corresponding four directions (upper, lower, left, right), and it is used as an input device for instructing the selection of various setting items in the setting of the mode or the like, or the change of the setting contents, and in the meantime, it is also used as the instructing device (an image selecting device) or the zoom operating device for instructing the scale factor adjustment of the electronic zoom, the movement instruction of the zoom center, the feeding and restoring of the reproduction frame.

At the bottom surface of the main body 2, a cartridge cover 19 that is opened and closed when installing or removing a film cartridge 18 is provided through a hinge 20. In the main body 2, a cartridge containing chamber 21 is formed, which is shielded by closing the cartridge cover 19. Reference numeral 22 denotes a knob member for opening the cartridge cover 19. When the knob member 22 is operated, the locking mechanism is released and the cartridge cover 19 is opened.

In FIG. 2, a camera 1 that uses a film cartridge 18 of a 24 mm film is shown, but the application range of the present invention is not limited to this, and it can be applied to a camera that uses a 35 mm film and other silver halide film photographic films.

Figure 3:
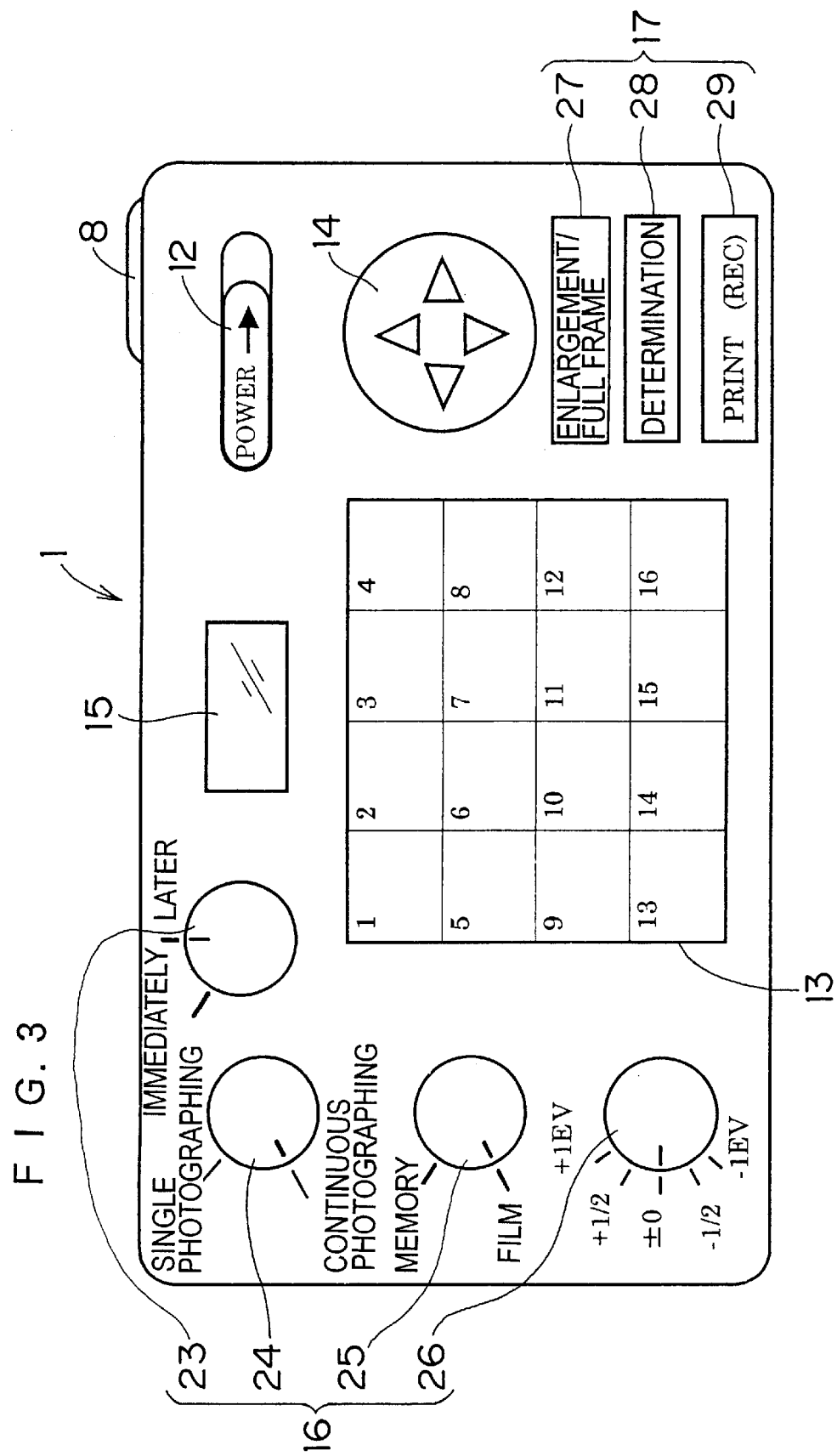
FIG. 3 is a rear view of the camera shown in FIG. 1.

FIG. 3 is a rear view of the camera 1. As shown in the above described figure, the camera 1 has, as operating knobs 16, a recording mode setting knob 23, a selecting knob 24 of the single-photographing and continuous-photographing, a selecting knob 25 of the memory and film, and an exposure compensation dial 26. Herein, it is also sufficient to make it possible to perform each setting on the setting screen of the liquid crystal display part 13, instead of the setting by these knobs.

The recording mode setting knob 23 is means for switching the recording mode setting between the mode setting where an image photographed by pressing the shutter button 8 is immediately recorded in a photographic film, and the mode setting where the data at the time of photographing is once stored in a memory and later, the recording is performed when the recording on a film is instructed.

The selecting knob 24 of the single-photographing and continuous-photographing is means for switching the photographing mode between the single photographing mode where one image is taken in by one time pressing-down operation of the shutter button 8, and the continuous photographing mode where a plurality of images are continuously taken in. The selecting knob 25 of the memory and film is a selecting device for selecting between the recording where a photographic image is recorded in a memory and the recording where an image is recorded on a film.

The exposure compensation dial 26 can perform the exposure compensation at each stage of (1) photographing time, (2) writing time in a memory, and (3) writing time on a film. The user can select any one among ±0 EV (no compensation), ±½ EV, and ±1 EV by operating the exposure compensation dial 26 according to the photographic situation.

Furthermore, the camera 1 has, as operating keys 17, a one frame enlargement and full frame switching switch 27, a frame determining switch 28, and a print (REC) switch 29. The one frame enlargement and full frame switching switch 27 is operated in the case where only one specific frame is enlarged and displayed when displaying a reproduction image on the liquid crystal display part 13. When the above described switch 27 is pressed once again, the display is restored to the full frame display (synoptic display).

In the full frame display, in the case where all frames cannot be displayed on one screen, they are displayed on divided pages. During the full frame display, when the cross button 14 is operated to select a desired frame and the frame determining switch 28 is pressed, the above described frame image becomes an object of the process. The print (REC) switch 29 is a switch for instructing the writing-out to a film (memory).

Figure 4:
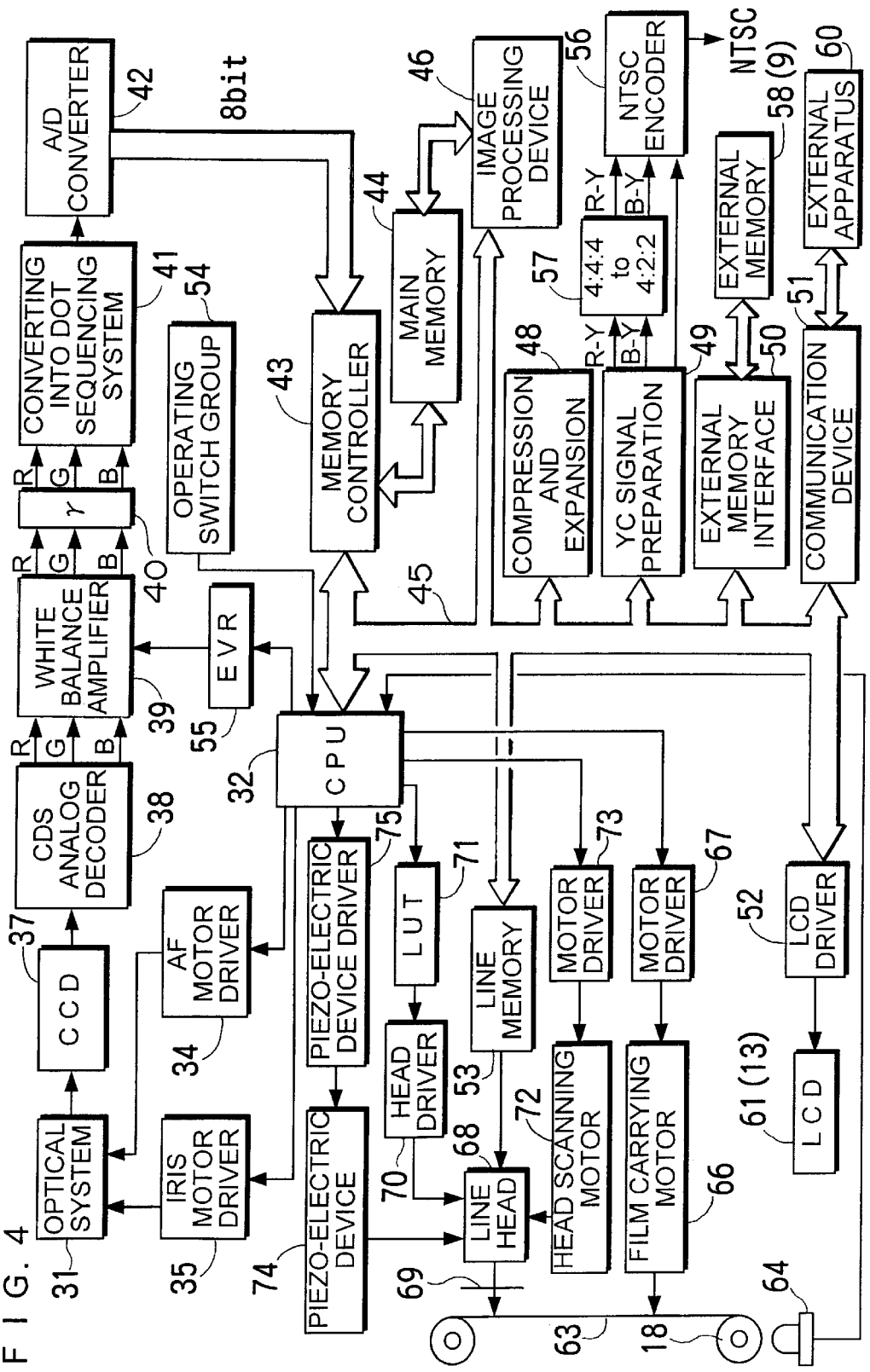
FIG. 4 is a block diagram of the camera according to the present embodiment.

FIG. 4 is a block diagram of the camera 1. An image-pickup optical system 31 includes the photographic lens 3 and an iris (not shown in the figure), and based on the instruction of a CPU 32, an AF motor driver 34 and an iris motor driver 35 are controlled, and the lens driving for the focus adjusting and the iris driving for the iris adjusting are performed.

The object image form on the light intercepting surface of a CCD 37 through the image-pickup optical system 31 is converted into a signal charge of an amount corresponding to the incident light amount in each sensor. The signal charge accumulated like this is read out to a shift register by a reed gate pulse added from a CCD driving circuit (not shown), and is read out in turn as a voltage signal (analog image signal) corresponding to the signal charge by a register transmission pulse.

To the CCD 37, a shutter drain is provided through a shutter gate, and by driving the shutter gate by a shutter gate pulse, the accumulated signal charge can be swept out to the shutter drain. That is, the CCD 37 has a so-called electronic shutter function for controlling the accumulation time (shutter speed) of the charge accumulated in each sensor by the shutter gate pulse.

The analog image signal read out of the CCD 37 is sent to an analog processing part 38, and in the analog processing part 38, it is subjected to the correlation double sampling (CDS) process and is color-separated into each color signal of R, G, B, and after that, it is added to a white balance amplifier 39.

The white balance amplifier 39 amplifies inputted R, G, B signals by a proper gain, and adjusts the white balance. The R, G, B signals outputted from the white balance amplifier 39 are added to a gamma compensation circuit 40, and here, they are gamma-compensated and added to a dot sequencing system converting circuit 41. The dot sequencing system converting circuit 41 converts the R, G, B signals inputted in the simultaneous system into the dot sequencing system, and outputs them to an A/D converter 42. The A/D converter 42 converts the R, G, B signals inputted in the dot sequencing system into the sequential digital signal. These R, G, B signals are stored in a main memory 44 through a memory controller 43.

The CPU 32 is connected to the memory controller 43, an image processing device 46, a compression and expansion circuit 48, a YC signal generating circuit 49, an external memory interface 50, a communication device 51, a liquid crystal display (LCD) driver 52, and a line memory 53 through a bus line 45, and based on the input from an operating switch group 54, it supervises and controls each circuit in the system. The operating switch group 54 is a block including the shutter button 8, cross button 14, operating knob 16, and operating key 17 or the like.

The CPU 32 functions as a processing part for performing the control such as the auto focus (AF), automatic exposure control (AE), auto strobe, or auto white balance. The CPU 32 drives an AF motor (not shown in the figure) through the AF motor driver 34 based on the AF information such as the focus evaluation information obtained from the image-pickup signal or the range information inputted from an AF sensor (not shown), and it moves the focus lens of the photographic optical system 31 to the focal position.

Furthermore, the CPU 32 determines the integrated value (AF information) made by integrating R, G, B digital signals of one frame or a color integrated value (AWB information) made by integrating signals for each color of R, G, B. Then, based on the AE information, it determines the iris value and the shutter speed, and drives the iris through the iris motor driver 35 and an iris motor (not shown in the figure) so that the determined iris value may be made, and in the meantime, it controls the accumulation time of the charge by an electronic shutter so that the determined shutter speed may be made. Furthermore, the CPU 32 determines the gains of the R, G, B signals based on the above described determined AWB information, and controls each gain of the white balance amplifier 39 through an electronic volume 55.

The image processing device 46 is a processing block for adding an effect by the exposure compensation dial 26 to the image data.

The YC signal generating circuit 49 prepares a brightness signal Y and a chroma signal C (chrominance signals B-Y, R-Y) from the inputted R, G, B digital signals. The brightness signal (signal Y) is added to an encoder 56, and the chroma signal (signal C) is converted from a signal of the 4:4:4 system of the brightness and chrominance signal (Y $C_B$ $C_R$) to a signal of the 4:2:2 system in a system converter circuit 57, and after that, it is added to the encoder 56.

The encoder 56 creates a given color complex image signal of the NTSC system or the like based on the inputted brightness signal Y and chrominance signals B-Y, R-Y, and outputs this to a video output terminal (not shown).

The compression and expansion circuit 48 compresses the non-compressed data, or expands and processes the compressed data to the non-compressed data, and in the case of compressing and recording image data, it compresses the brightness signal Y and chroma signal C corresponding to one frame that have been prepared through the YC signal generating circuit 49, in a given system, and records the compressed data in an external memory 58 such as the memory card 9 through the external memory interface 50. Furthermore, in the case of reading the compressed data out of the external memory 58 through the external memory interface 50, it expands and processes the read-out compressed data to non-compressed data, and stores this in the main memory 44 through the memory controller 43.

To the communication device 51, an external apparatus 60 such as an external printer or a personal computer (PC) is connected through a cable or radio interface, and it is possible to transmit and receive the image data to and from the external apparatus 60. Furthermore, it is also possible to input an external trigger (photographing start instruction signal) for performing the photographing from the external apparatus 60.

The LCD driver 52 drives an LCD 61 so that an image (through image) while being photographed by the CCD 37, a preview image of an image obtained answering the pressing operation of the shutter button 8, or a reproduction image or the like read out of the memory card 9 or the like may be displayed on the LCD 61 (corresponding to the liquid crystal display part 13).

Next, the configuration of a writing device (optical printer) for writing the information in a photographic film 63 in the above described camera 1 will be described. To the camera 1, an information reading device 64 for reading the information of the photographic film 63, a motor (called a film carrying motor) 66 to be a power source for carrying the photographic film 63, a motor driver 67 for driving the above described motor 66, a line head 68 for exposing the photographic film 63 based on the data supplied from the line memory 53, a filter 69 arranged between the light source of the line head 68 and the photographic film 63, a head driver 70 for driving the line head 68, a lookup table (LUT) 71 for properly converting the control signal from the CPU 32 and for outputting that to the head driver 70, a motor (called a head scanning motor) 72 to be a power source for moving the head for scanning, a motor driver 73 for driving the above described motor 72, a piezo-electric device 74 for slightly moving the line head 68 in the main scanning direction, and a piezo-electric device driver 75 are provided.

In the case where a 24 mm film is used, the information reading device 64 is means for reading the bar code written on a data disk. The data disk is formed integrally with a cartridge spool, and it reads the bar code information by rotating this cartridge spool and by using a photo-reflector arranged on the camera side. In the bar code, various types of information such as the film sensitivity, the number of films, the type of the film (color negative, color reversal, black and white, and others) is put.

Furthermore, in the case where a 35 mm film is used, the information reading device 64 is means for reading the CAS code (Camera Auto-Sensing Code) formed on the surface of a cartridge (shielding container). In the case of a 35 mm film, a checker-flag-like conductive and non-conductive contact point pattern (this code is called a DX code) is provided on the surface of the cartridge, and by detecting this with a terminal of the camera, the film information such as the film sensitivity or the latitude can automatically be obtained by the camera.

The film information (information such as the film length, film sensitivity, or latitude) obtained by the information reading device 64 is inputted into the CPU 32. The lookup table 71 is a conversion table for changing the exposing time by using the information of the film sensitivity and latitude according to the command of the CPU 32.

Figure 5A:
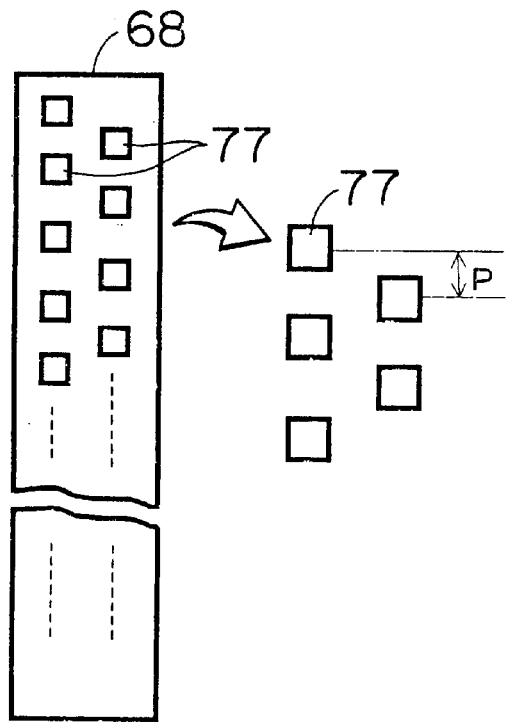
FIGS. 5(a) and 5(b) are enlarged views showing examples of a line head in FIG. 4.
Figure 5B:
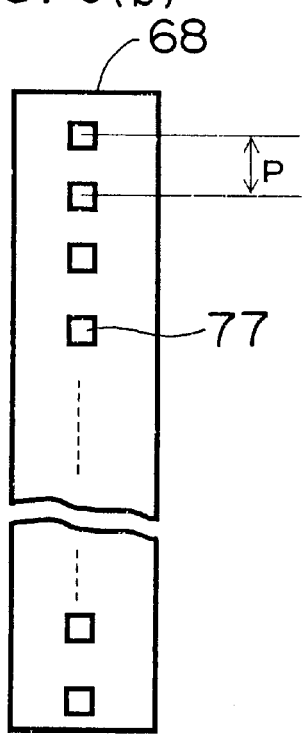

FIGS. 5(*a*) and 5(*b*) show examples of the line head 68. The line head 68 shown in the above described FIG. 5(*a*) has a form in which light emitting devices 77 are linearly arranged in two lines in the longitudinal direction, and two light emitting device lines are arranged having a positional relation of being shifted from each other in the vertical direction in FIG. 5(*a*) by P as if forming a hounds-tooth check. For the light emitting device 77, a white light source is used, and an LED or a fluorescent head can be applied. Furthermore, as shown in FIG. 5(*b*), the configuration in which light emitting devices 77 are arranged in one line is also possible.

FIG. 6 is a side view of the line head 68. The line head 68 is movably supported in the vertical direction on the paper by guide shafts 78, 79, and the driving force of the head scanning motor 72 is transmitted to the line head 68 by a power transmitting device (not shown), so that the head may move along the guide shafts 78, 79.

Furthermore, to the line head 68, the piezo-electric device 74 is provided, and in the meantime, in the connecting part between the guide shaft 79 and the line head 68, a groove 68A having an open side end surface and a U-shaped cross section is formed so that the line head 68 may be moved in the main scanning direction (horizontal direction in FIG. 6) by the piezo-electric device 74.

In such a configuration, the line head 68 is moved along the sub-scanning direction (vertical direction on the paper in FIG. 6) by the head scanning motor 72, and it is moved in the main scanning direction (horizontal direction in FIG. 6) by the piezo-electric device 74. By the piezo-electric device 74, the line head 68 is moved in the range of the arrangement pitch P of the light emitting devices 77, and consequently, the light emitting point is shifted, and the image recording with a higher resolving power is performed.

The filter 69 has, as shown in FIG. 7, a structure where three color filters of a red filter R, a green filter G, and a blue filter B can be moved relative to the line head 68 by a switching mechanism (not shown). An example of the switching mechanism of the filter 69 will be described later (FIGS. 19 to 24).

Next, the action of the camera 1 configured as described above will be described.

Figure 8:
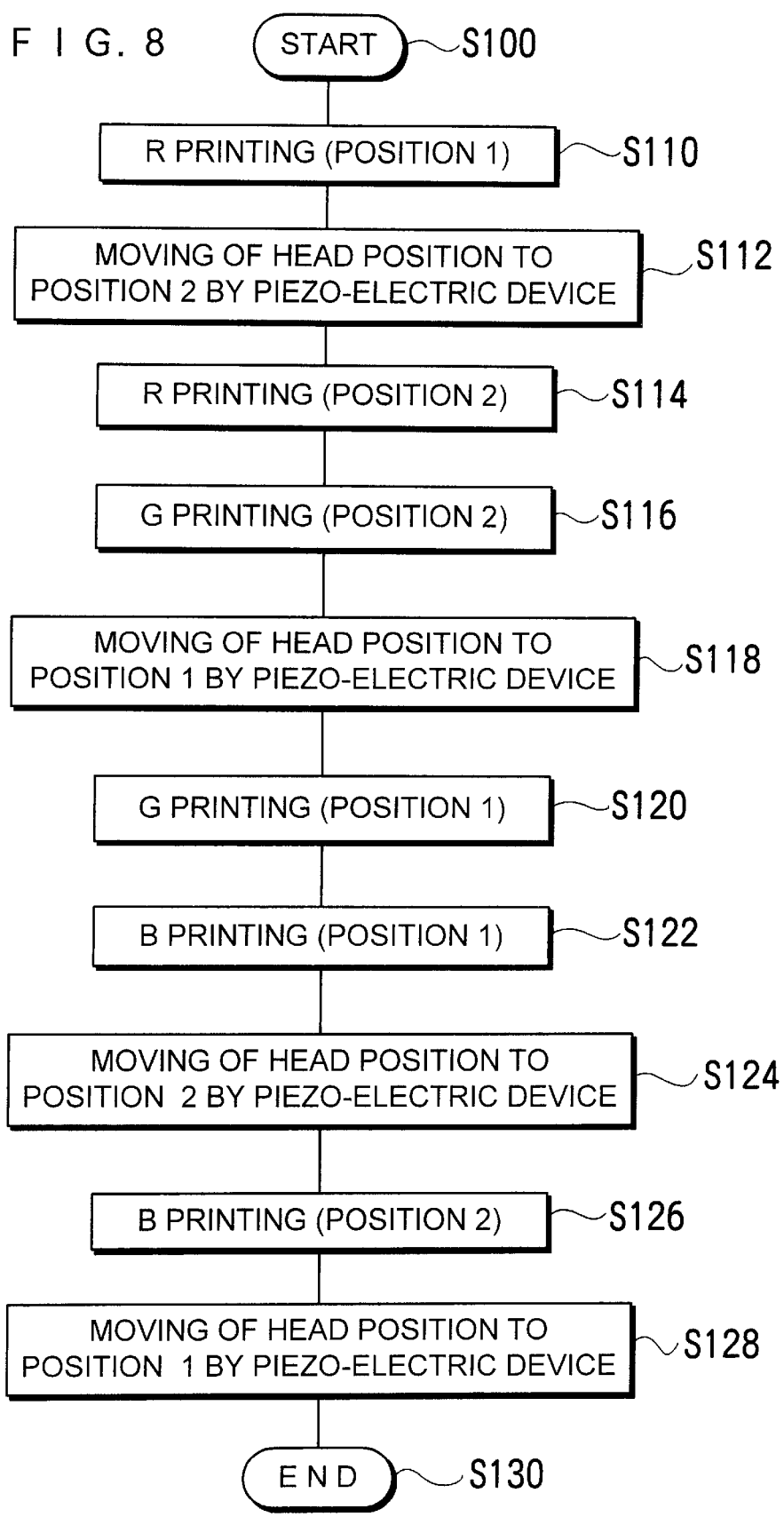
FIG. 8 is a flow chart showing the control procedure of the image element shift printing using a piezo-electric device in the camera of the present example.

FIG. 8 is a flow chart showing the control procedure of the CPU 32 of the camera 1. In the line head 68 having a structure described in FIGS. 5(a) to 7, it is possible to control the line head 68 to two positions of "position 1" and "position 2" by moving the line head 68 in the main scanning direction by using the piezo-electric device 74.

When the process of image recording on the photographic film 63 is started (step S100), first, the CPU 32 sets the line head 68 at "position 1" that is the initial position, and sets the filter 69 to the red filter R. Then, the printing action is performed from the printing start position (home position) (step S110). This printing action performs the first printing of red color (R) by controlling the light emission of the light emitting device 77 of the line head 68, while moving the line head 68 in the sub-scanning direction by using the head scanning motor 72.

When the first R printing has been finished, the head position is moved to "position 2" by the piezo-electric device 74 (step S112). Then, while moving the line head 68 in the sub-scanning direction by the head scanning motor 72, the light emission of the light emitting device 77 of the line head 68 is controlled, and the second printing of R is performed (step S114). Thus, the position of the line head 68 is changed as for the main scanning direction, and two times of printings are performed and the R printing is finished.

When the second R printing has been finished, the filter 69 is switched to the green filter G, and the first G printing is performed (step S116). The G printing at this moment is performed in the state where the line head 68 still stays in "position 2" taking over the state of R printing finish.

When the first G printing has been finished, the head position is moved to "position 1" by the piezo-electric device 74 (step S118). Then, while moving the line head 68 in the sub-scanning direction by the head scanning motor 72, the light emission of the light emitting device 77 of the line head 68 is controlled, and the second printing of G is performed (step S120). Thus, the position of the line head 68 is changed as for the main scanning direction, and two times of printings are performed and the G printing is finished.

When the second G printing action has been finished, the filter 69 is switched to the blue filter B, and the first B printing is performed (step S122). The B printing at this moment is performed in the state where the line head 68 still stays in "position 1" taking over the state of G printing finish.

When the first B printing has been finished, the head position is moved to "position 2" by the piezo-electric device 74 (step S124). Then, while moving the line head 68 in the sub-scanning direction by the head scanning motor 72, the light emission of the light emitting device 77 of the line head 68 is controlled, and the second printing of B is performed (step S126). Thus, the position of the line head 68 is changed as for the main scanning direction, and two times of printings are performed and the B printing is finished.

When two times of B printings have been performed, the head position is moved to "position 1" by the piezo-electric device 74 (step S128), and the image recording process is finished (step S130).

Figure 9:
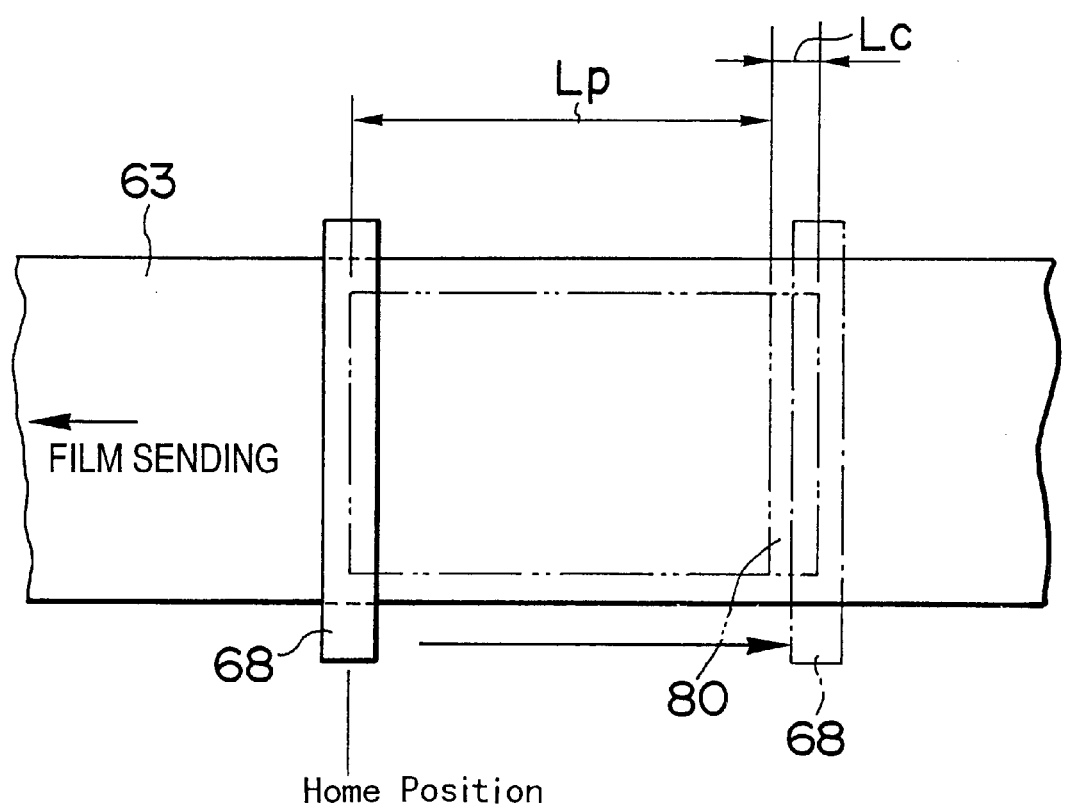
FIG. 9 is an explanation figure showing the positional relation between the line head and the photographic film.

The size of an image to be written on the photographic film 63 is not limited to the exposure size specified in a normal optical type camera (17.6×30.2 mm in the case of the a 24 mm film and 24×36 mm in the case of a 35 mm film), but as shown in FIG. 9, the recording by an arbitrary length Lp can be performed as for the longitudinal direction of the film.

Figure 10A:
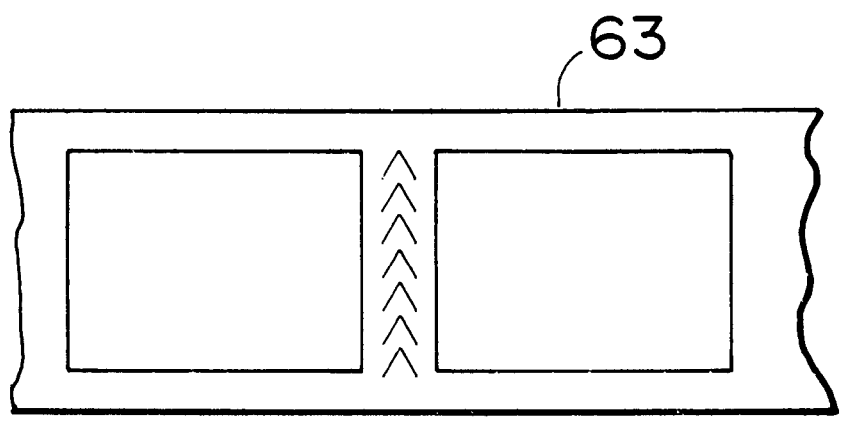
FIGS. 10(a) and 10(b) are figures showing examples of additional information formed in the inter-frame area.
Figure 10B:
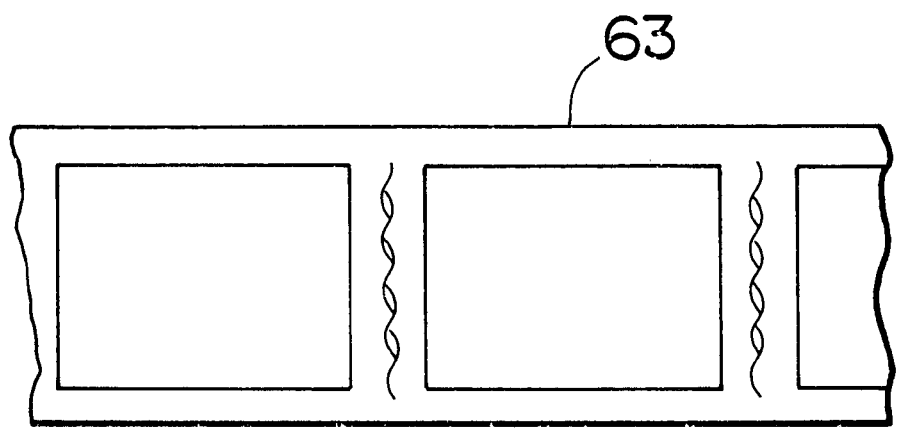

Furthermore, it is possible to write the photographic conditions and other information such as the date and time of photographing, the focal length of the lens, the F number, the shutter speed, or the exposure compensation value in the area between a frame and a frame on the photographic film 63. Such an inter-frame information writing area 80 is also not limited to a given size, but the recording by an arbitrary length Lc can be performed as for the longitudinal direction of the roll-shaped photographic film 63. The information to be written in the inter-frame area 80 is not limited to character information, but it may be, as shown in FIGS. 10(a) and 10(b), an arbitrary pattern or a banner image.

Figure 11:
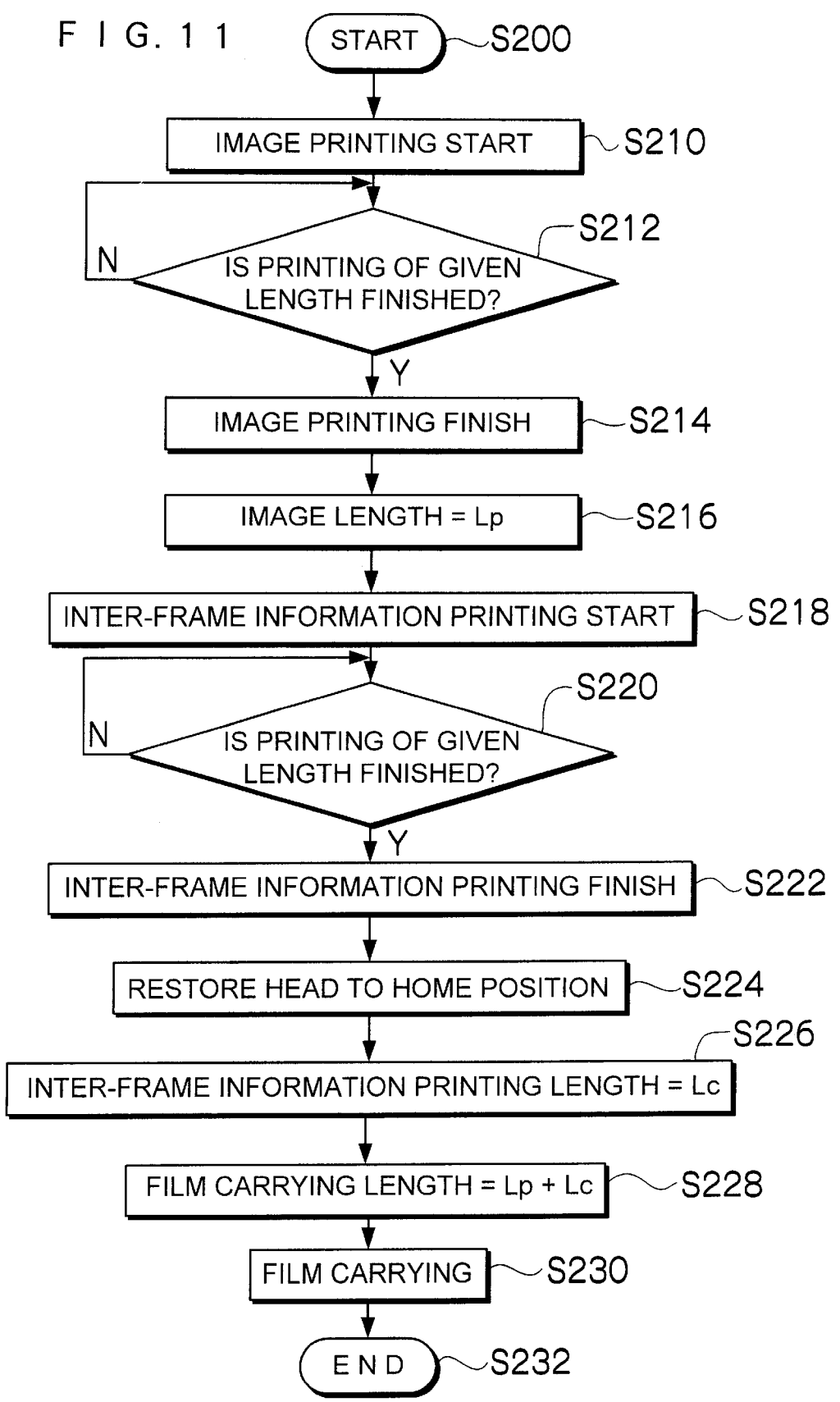
FIG. 11 is a flow chart showing the procedure of the film exposure control in the camera of the present example.

FIG. 11 is a flow chart showing the procedure of the printing control in the above described camera 1. According to the above described figure, when the writing-in (printing) process to the photographic film 63 is started (step S200), the CPU 32 starts the printing action of an image (step S210). Then, the CPU 32 watches whether printing of a given length has been finished or not as for the information of an image to be exposed (step S212). When the printing has not been finished, it continues the printing action, and repeats step S212.

When the printing finish is confirmed at step S212, the printing action of the image is finished (step S214), and the length Lp of the image printed by the above described printing action is stored (step S216). Next, the printing of the inter-frame information of the photographic conditions or the like is started (step S218).

The CPU 32 judges whether the printing of a given length has been finished or not as for the inter-frame information (step S220), and when it has not been finished, the printing action is continued and step S220 is repeated. On the other hand, when the printing finish is confirmed at step S220, the printing action of the image is finished (step S222), and the line head 68 is restored to the home position (step S224).

Next, the CPU 32 obtains the information on the length Lc of the image printed by the printing action in the above described inter-frame information (step S226), and it adds this Lc and the length Lp of the image obtained at the above described step S214, and makes the additional result be the carrying length of the film (step S228).

According to the film carrying length obtained at step S228, the film carrying motor 66 is driven to perform the carrying of the photographic film 63 (step S230), and the image writing-in process for one frame is finished in the state of being set in a position of the next image recording start (step S232).

As previously described, in the camera 1 of the present example, an image is recorded by an arbitrary length in the longitudinal direction of the photographic film 63, and it is possible to write in the inter-frame information, and therefore, it is necessary to accurately grasp the length of the recorded film. Therefore, in the camera 1 of the present example, the following means is adopted:

FIG. 12 is a flow chart of the control for grasping the record length of a film. When a new film cartridge 18 is loaded in the camera 1, the CPU 32 starts the control process (step S300), and initially sets the photographic frame count number "i" at "0" (step S310), and in the meantime, it initially sets the present value of the printing full length at "0" (step S312). Next, it judges whether the result obtained by subtracting the printing full length from the film length is larger than a given length that is the recordable minimum film length or not (step S314). Herein, the information on the full length of the film is obtained from the information reading device 64 described in FIG. 4. When a new film cartridge 18 is loaded, the printing full length is "0" because of the initial setting, and therefore, the judgment of YES is made at step S314.

When the judgment of YES is obtained at step S314, the step advances to step S316, and whether a printing instruction exists or not is judged. When there is no instruction that the line head 68 should write an image in the photographic film 63 (when the judgment of NO is made), step S316 is repeated. When there is an instruction of writing in an image (printing) (when the judgment of YES is made), the step advances to step S318.

At step S318, the photographic frame count number "i" is counted up by +1 and "i" is rewritten. Next, at step S320, the printing action is performed, and the frame image printing length Lp "i"=Lp, and the inter-frame information printing length Lc "i"=Lc are stored.

Then, the step advances to step S322, and here, the printing full length up to the present photographic frame count number "i" is calculated. The printing full length $L_{total}$ is calculated according to the following equation (1):

$$L_{total} = \sum_{j=1}^{i} (Lp[j] + Lc[j]) \quad (1)$$

After step S322, the step returns to step S314, and whether the result obtained by subtracting the printing full length from the film length is larger than a given length or not is judged (step S314).

When the remaining amount of the film is larger than the given length, step S314 to step S322 are repeated. If it is judged at step S314 that the remaining amount of the film is smaller than the given length, the image writing-in cannot further be performed, and therefore, the step advances to step S324, and the rewinding action of the film is performed. Thus, the film sending control for one roll is finished (step S326).

FIG. 13 is a flow chart showing the control procedure of the brightness compensation at the time of writing-in to an external memory such as a memory card 9, or a film.

When the brightness compensation control is started (step S400), first, the CPU 32 reads in the setting of the exposure compensation dial 26 (step S410). Then, whether the compensation exists or not is judged (step S412). When the judgment of existence of compensation judgment of YES) is obtained, the step advances to step 414, and the reading-in of the image data from the main memory 44 is performed. Next, the image process is performed in the image processing device 46 according to the setting of the exposure compensation dial 26 (step S 416), and the image data obtained by the above described process is written in the main memory 44 (step S418).

After step S418, or when the judgment of no compensation (judgment of NO) is obtained at step S412, the step advances to step S420. At step S420, whether the recording destination of the image information is an external memory (memory card 9) or a photographic film 63 is judged. In the case where the recording destination is an external memory, the step branches to step S422, and the writing-out to the external memory of the image data is performed.

On the other hand, when it is judged at step S420 that the recording destination is the photographic film 63, the step advances to step S424, and a suitable lookup table 71 is determined from the information of the film sensitivity and latitude. Then, according to the determined lookup table 71, the light emitting device 77 of the line head 68 is controlled, and the photographic film 63 is exposed (step S426). When the recording of the image information has been finished at step S422 or step S426, the brightness compensation control is finished (step S428).

Herein, in the exposure compensation at the time of photographing, as well known, the shutter speed and the iris are controlled according to the setting of the exposure compensation dial 26.

FIG. 14 is a flow chart showing the procedure of the image recording control at the time of continuous photographing. When the recording control by the continuous photographing mode is started (step S500), first, the CPU 32 judges whether it is during the continuous photographing or not (step S510). When such a judgment that it is during the continuous photographing (judgment of YES) is obtained, the step advances to step S512, and the photographing action is performed, and the obtained image data is stored in the main memory 44 (step S514). After step S514, the step returns to step S510.

When the continuous photographing has been finished, the judgment of NO is made at step S510, and the step advances to step S516. At step S516, a series of images obtained by the continuous photographing are displayed on the liquid crystal display part 13 (LCD 61). The display form at this moment may be a synoptic display where a plurality of small images are arranged, or it may be a display where the frames are displayed one by one and the image to be displayed is changed according to the operation of the cross button 14.

Looking at the display of the image at step S516, the user performs the selection of the image of the frame to be exposed on the photographic film 63 (step S518). The selection of the image is instructed by the cross button 14 and the frame determining key 28. Next, the step advances to step S520, and whether there is a frame to be exposed on the photographic film 63 or not is judged.

When the judgment of existence of a frame to be exposed (judgment of YES) is obtained, the line head 68 is controlled, and the image according to the above described selection is exposed on the photographic film 63 (step S522). After step S522, or when the judgment of no frame to be exposed judgment of NO) is obtained at step S520, the step advances to step S524.

At step S524, the user performs the selection of the frame image to be recorded in the external memory from among the series of images obtained by the continuous photographing. Next, the step advances to step S526, and whether there is a frame to be exposed on the photographic film 63 or not is judged.

When the judgment of existence of a frame to be recorded in the external memory 58 judgment of YES) is obtained, the image according to the above described selection is recorded in the external memory 58 (step S528). After step S528, or when the judgment of no frame to be recorded judgment of NO) is obtained at step S526, the recording control by the continuous photographing is finished (step S530).

Next, a modified example of the present embodiment will be described.

Instead of the line head 68 described in FIGS. 5(*a*) and 5(*b*), a line head 82 shown in FIG. 15 may be used. The line head 82 shown in the above described figure has a three line structure where the light emitting devices 84R, 84G, 84B corresponding to the respective colors of red (R), green (G), blue (B) are arranged in three lines. This line head 82 is applied, and as shown in FIG. 16, the line head 82 is moved in the sub-scanning direction (horizontal direction in FIG. 16). Consequently, the switching mechanism of the filter 69 is omitted, and a color image can be formed by performing the printing action one time for each of "position 1" and "position 2" (one round trip in all).

Figure 17:
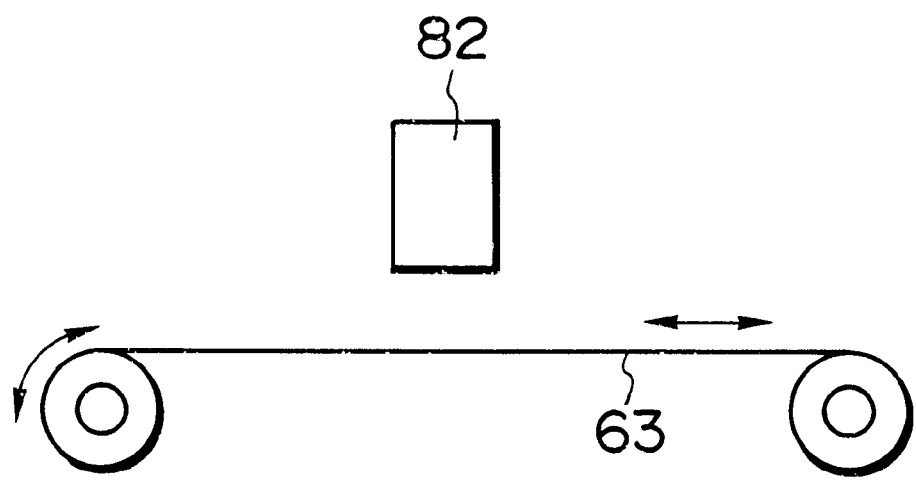
FIG. 17 is a schematic view showing another exposing method by the line head shown in FIG. 15.

Herein, as shown in FIG. 17, it is also possible to print an image in a way where the line head 82 is fixed in the sub-scanning direction and the photographic film 63 is reciprocated. In this case, it is also possible to move the line head 82 in the main scanning direction (vertical direction on the paper in FIG. 17).

In FIG. 18, a form of still another line head is shown. Instead of the line head described in FIGS. 5(*a*) and 5(*b*) or FIG. 15, a line head 86 shown in FIG. 18 may be applied. This line head 86 has a light source 87, a mirror 88, a lens 89, and a filter 69 of three colors of R, G, B that can be switched for the above described light source.

For the light source 87, a white fluorescent display head is used, and behind the light source 87, the mirror 88 is arranged. The lens 89 is made of a refraction factor distribution type lens array (selfock lens array), and it continues in the vertical direction on the paper in FIG. 18.

The filter 69 is arranged between the light source 87 and the lens 89, and it can be moved in the sub-scanning direction by a switching mechanism (not shown in FIG. 18), and a desired color filter among the red filter R, green filter G, and blue filter B can be arranged on the optical axis of the lens 89.

As a switching mechanism of the filter 69, for example, a mechanism disclosed in Japanese Patent Application Laid-Open No. 9-1858 can be utilized. An example of the switching mechanism of a filter will be described below by using FIG. 19 to FIG. 22.

As shown in these figures, a base body 90 on which the line head 86 is mounted is an approximately rectangular plate-like body, and it is slidably supported by guide bars 91, 91. The guide bars 91, 91 are arranged in parallel with the sub-scanning direction at the time when writing an image in the photographic film 63, and the base body 90 can be moved in the sub-scanning direction. Approximately at the central part of the base body 90, a mounting hole 92 is penetratingly formed. In the mounting hole 92, a filter holder 93 is movably attached.

Furthermore, to the base body 90, a guide groove part 94 for guiding the filter holder 93 is provided continuously to the above described mounting hole 92, and it reaches one edge part (right edge part in FIG. 19) in the moving direction of the base body 90. The filter holder 93 is a member in which a rectangular main body 95 slidably engaged with the mounting hole 92 of the base body 90 and a rectangular striking piece 96 engaged with the guide groove part 94 of the base body 90 are integrally configured, and it is shaped approximately like L as a whole.

At one edge part of the guide groove part 94 of the base body 90, two fixed bearings 97, 98 as guiding means are rotatably provided. At the other edge part of guide groove part 94 opposite to these fixed bearings 97, 98, a movable bearing 99 is provided.

As shown in FIG. 20, the movable bearing 99 is rotatably provided to a support shaft 100. The support shaft 100 has the middle part attached to the base body 90 through a shaft 101, and it can be rotated in a given rotational angular range in a plane in parallel with the main scanning direction around the shaft 101.

The lower end of the support shaft 100 projects downward from the undersurface of the base body 90. In the interior of the base body 90, a spring 102 as urging means is contained, and the above described spring 102 is held by a cap screw 103. This spring 102 urges the movable bearing 99 toward the filter holder 93.

As shown in FIG. 19 to FIG. 22, the striking piece 96 of the filter holder 93 is held between the fixed bearings 97, 98 provided in the guide groove part 94 of the base body 90 and the movable bearing 99, and it is guided in the sub-scanning direction. At the undersurface of this striking piece 96, a projection 104 is provided, and the above described projection 104 penetrates an elongated through hole 105 provided in the guide groove part 94 of the base body 90, and projects downward from the undersurface of the base body 90.

Between the lower end of this projection 104 and a shaft 106 of the above described fixed bearing 98, a spring 107 as urging means is provided. The spring 107 urges the filter holder 93 to the right in FIG. 19. At the edge on the movable bearing 99 side of the striking piece 96, notch parts C1, C2, C3 are formed in three places. The movable bearing 99 is selectively engaged with one of these notch parts C1, C2, C3, and the filter holder 93 is selectively set at any one of the three places to the base body 90.

In the main body 95 of the filter holder 93, three penetrating grooves in parallel with the main scanning direction are formed. To each groove, a red filter R, a green filter G, and a blue filter B are attached, respectively. The arranging distance in the sub-scanning direction of each filter corresponds to the distance of the above described notch parts C1, C2, C3 formed in the striking piece 96 of the filter holder 93.

In each of the filters R, G, B, the length and direction agrees to the light source 87 of the line head 86. Then, in the three positions where the filter holder 93 is selectively set, each filter is selectively set on the optical axis of the lens 89. FIG. 19 shows the state where the movable bearing 99 is engaged with the notch part C1 and the red filter R is set, and FIG. 21 shows the state where the movable bearing 99 is engaged with the notch part C2 and the green filter G is set, and FIG. 22 shows the state where the movable bearing 99 is engaged with the notch part C3 and the blue filter B is set.

Figure 21:
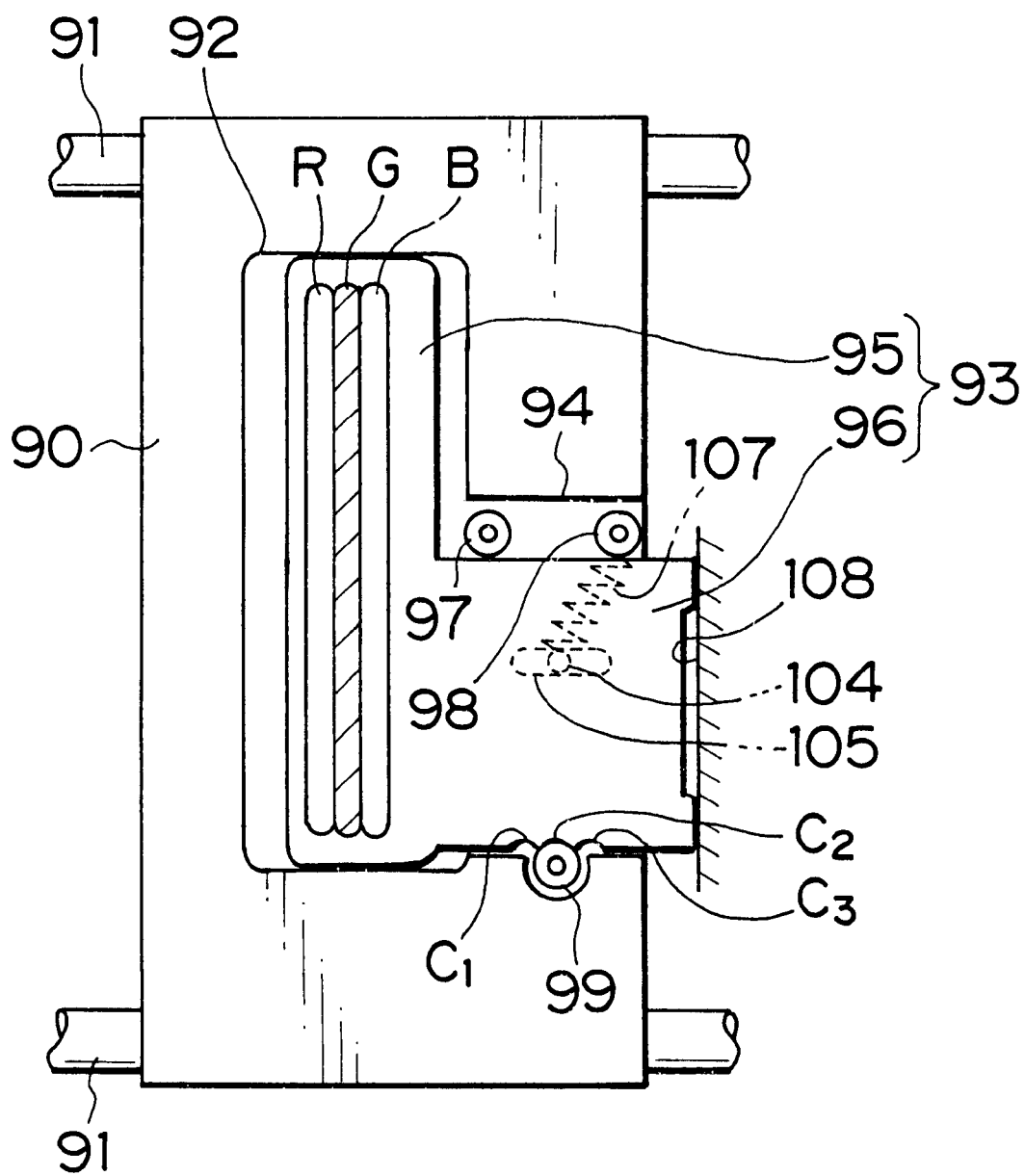
FIG. 21 is a figure showing how a green filter is set in the filter switching mechanism shown in FIG. 19.
Figure 22:
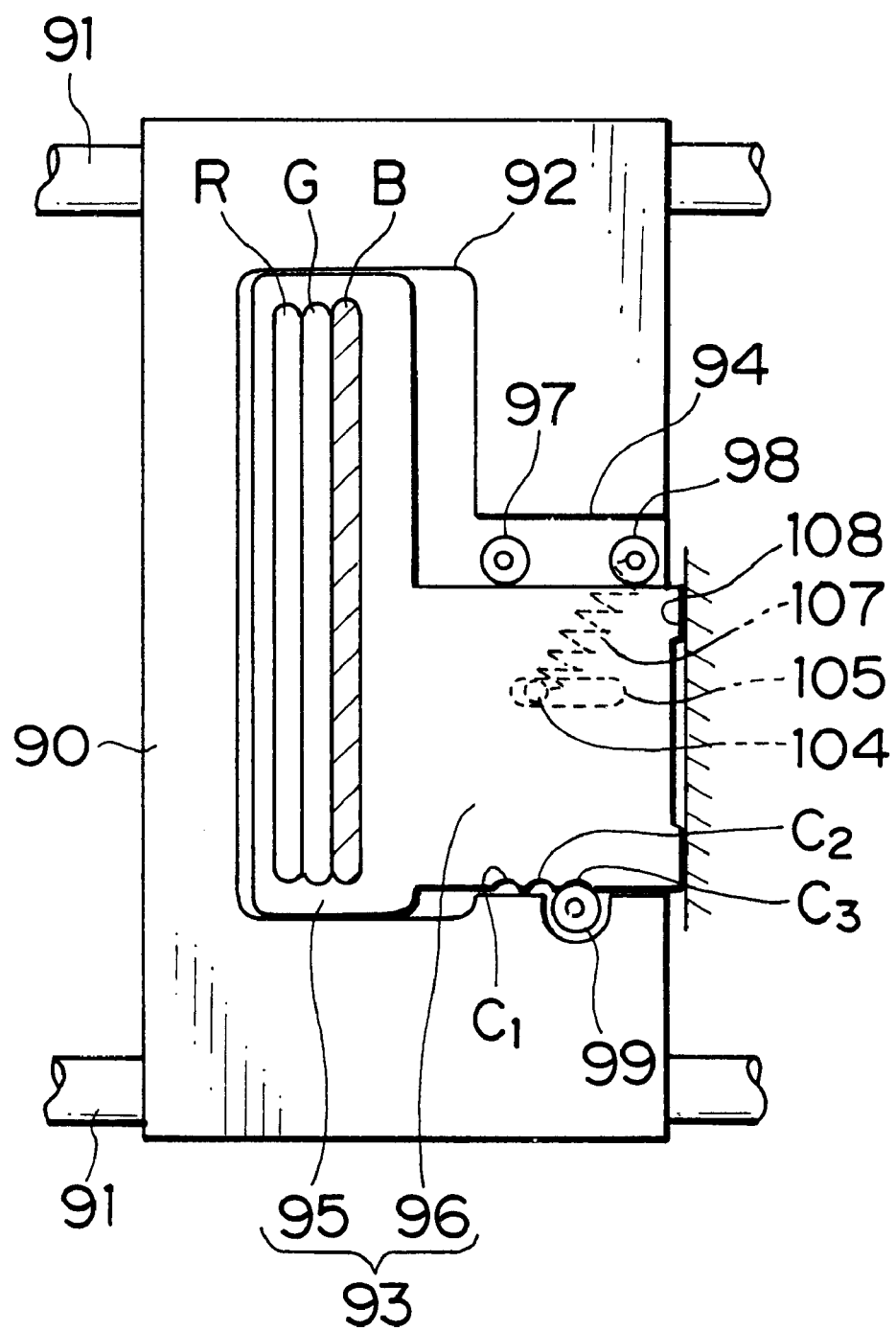
FIG. 22 is a figure showing how a blue filter is set in the filter switching mechanism shown in FIG. 19.

As shown in FIG. 21 and FIG. 22, in the interior of the camera 1, a contact part 108 to come into contact with the striking piece 96 is provided at a given position, and when the base body 90 is moved by driving the head scanning motor 72 and the striking piece 96 of the filter holder 93 is struck against the contact part 108, the filter holder 93 is moved in the sub-scanning direction relative to the base body 90, and a desired filter can be positioned on the optical axis of the lens 89.

Furthermore, as shown in FIG. 19 and FIG. 20, a fixing piece 109 to be engaged with the lower end of the support shaft 100 of the movable bearing 99 is provided at a given position in the interior of the camera 1. In the fixing piece 109, the surface on the side of coming into contact the support shaft 100 is fixedly provided with a given tilt angle to the sub-scanning direction (tilting up to the left in FIG. 19), and when the base body 90 is moved in the direction of being separated from the contact part 100 and the support shaft 100 of the movable bearing 99 is engaged with the fixing piece 109, the support shaft 100 is rotated around the shaft 101 (rotated in the counterclockwise direction in FIG. 20), and the movable bearing 99 is separated from the notch parts C1, C2, C3 of the filter holder 93. Consequently, the filter holder 93 is moved toward the contact part 108 by the urging force of the spring 107, and the movable bearing 99 is engaged with the notch part Cl that is farthest from the contact part 108. At this moment, in the line head 86, the red filter R is set for the light source 87.

When the exposure by the red filter R has been finished, the line head 86 is further moved toward the contact part 108 by a length corresponding to the distance of the above described notch parts C1, C2, C3. Consequently, the filter holder 93 strikes against the contact part 108 and moves in the sub-scanning direction relative to the base body 90, and the movable bearing 99 is engaged with the notch part C2. Thus, the green filter G is set for the light source 87.

When the exposure by the green filter G has been finished, the line head 86 is further moved toward the contact part 108 by a length corresponding to the distance of the above described notch parts C1, C2, C3. Consequently, the filter holder 93 strikes against the contact part 108 and moves in the sub-scanning direction relative to the base body 90, and the movable bearing 99 is engaged with the notch part C3. Thus, the blue filter B is set for the light source 87.

When the exposure by the blue filter B has been finished, as mentioned above, the base body 90 is moved in the direction (to the left in FIG. 22) of being separated from the contact part 108, and the support shaft 100 of the movable bearing 99 is engaged with the fixing piece 109, and the filter is restored to the red filter R.

Figure 23:
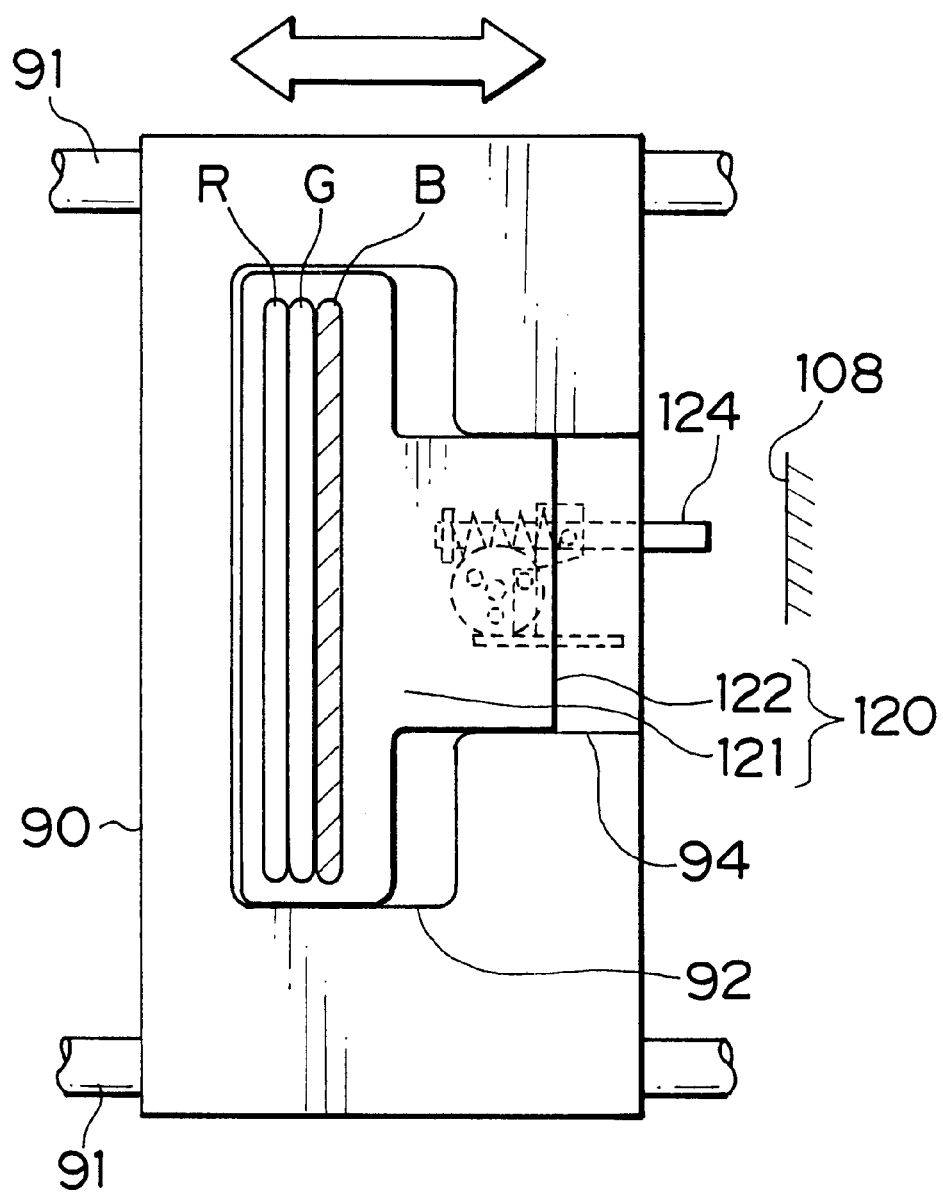
FIG. 23 is a plan view showing another example of the filter switching mechanism.

FIG. 23 and FIG. 24 show another example of a filter switching mechanism. In the switching mechanism shown in these figures, the same reference numerals are given to the parts that are the same as or similar to those in the switching mechanism described in FIG. 19 to FIG. 22, and the description will be omitted.

A filter holder 120 shown in FIG. 23 is an approximately T-shaped member made of a main body 121 and a striking part 122. To the striking part 122, a ratchet mechanism to be described in detail in FIG. 24 is provided, and it is configured so that three filters R, G, B can selectively be set.

To the base body 90, a bar-like operational body 124 is movably provided in the sub-scanning direction. One end part of the operational body 124 faces to the contact part 108 existing outside the base body 90. As shown in FIG. 23, the other end part of the operational body 124 penetrates a spring stopper 125 provided to the base body 90. A square cylindrical fixing body 126 is fitted on the middle part of the operational body 124, and it is swingably connected to the operational body 124 by a shaft 127. A spring 128 is fitted on the above described operational body 124 between the shaft 127 of the above described fixing body 126 and the above described spring stopper 125. In the fixing body 126, one side based on the axial line of the operational body 124 (lower side in FIG. 24) projects approximately like a triangle, and the above described part is made to be a fixing claw 126A.

To the base body 90, a ratchet wheel 130 is rotatably pivoted. At the undersurface of the ratchet wheel 130, three fixing pins 131 are provided downward at intervals of 120 degrees in the rotational direction. These fixing pins 131 are engaged with the above described fixing claw 126A accompanied with the movement of the above described operational body 124. In the periphery of the ratchet wheel 130, a notch part 132 is formed at a positions corresponding to each engaging pin 131. To the base body 90, one end of a plate spring 133 is fastened, and the other end of the above described plate spring 133 is arranged so that it may come into contact with the periphery of the ratchet wheel 130 to be engaged with each of the above described notch parts 132.

To the upper surface of the ratchet wheel 130, a guide pin 134 is attached facing upward at a position corresponding to one among the above described three fixing pins 131. On the other hand, in the filter holder 120, a long elongated hole 135 is provided along the main scanning direction. The above described guide pin 134 is engaged with this elongated hole 135.

According to such a configuration, when the line head 86 is moved in the sub-scanning direction and the operational body 124 is struck against the contact part 108, the operational body 124 is pressed in against the urging force of the spring 128, and the fixing claw 126A is engaged with the fixing pin 131 of the ratchet wheel 130 so that the ratchet wheel 130 may be rotated by 120 degrees (one stroke). Consequently, the plate spring 133 is engaged with the next notch part 132 to fix the ratchet wheel 130 at a new position.

The filter holder 120 that is interlocked and connected to the guide pin 134 of the ratchet wheel 130 is moved in the sub-scanning direction relative to the base body 90, and consequently, the filter is switched. According to this structure, the position of the filter holder 120 is circularly switched with the rotation of the ratchet wheel 130.

The filter switching mechanism described in FIGS. 19 to 22 and the filter switching mechanism described in FIGS. 23 and 24 can also be applied to the line head 68 described in FIGS. 5(*a*) to 7.

Figure 25:
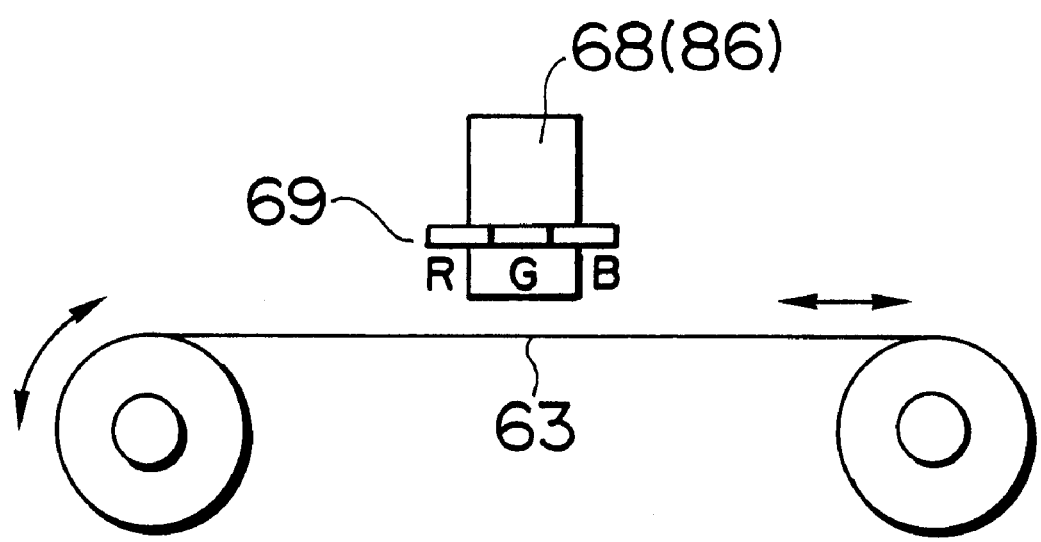
FIG. 25 is a schematic view showing another exposing method by the line head.

In the embodiment described in FIGS. 1 to 13, the printings of the respective colors of the R printing, G printing, and B printing are performed on the photographic film 63 by moving the line head 68 in the sub-scanning direction, but as shown in FIG. 25, it is also possible to print an image in such a way where the line head 68 is stopped in the sub-scanning direction during the printing and the line head 68 is moved relatively to the photographic film 63 by reciprocating the photographic film 63. In this case, the line head 68 can be moved in the main scanning direction (vertical direction on the paper in FIG. 25).

As described above, by using a camera according to the present invention, it is possible to expose an image that is electronically picked up through an image sensor, or an image, a drawing, or a document or the like that is edited by a personal computer or the like, on a silver halide film photographic film by using an optical printer contained in the camera, and therefore, the degree of freedom of the print size is increased, and the cost down of a plurality of sheets of printing (additional printing) can be attained.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera comprising:
   an image sensor which picks up an object image and outputs an image-pickup signal;
   a storage device which stores image data;
   an optical printer which exposes a photographic film based on image data read out of the storage device, and which records an image on the photographic film; and
   a carrying device which carries the photographic film.

2. The camera according to claim 1, wherein the storage device comprises an external memory that is removably attached to a camera body.

3. The camera according to claim 1, wherein the storage device comprises a memory contained in the camera.

4. The camera according to claim 1, wherein the storage device comprises an external memory that is removably attached to a camera body and a memory contained in the camera.

5. The camera according to claim 1, wherein the photographic film is a silver halide roll film wound and contained in the form of a roll in a shielding container.

6. The camera according to claim 5, wherein image recording length can be changed in the longitudinal direction of the silver halide roll film.

7. The camera according to claim 5, wherein the camera is configured so as to record additional information in an area between frames of the silver halide roll film by the optical printer.

8. The camera according to claim 7, wherein a distance between frames is changed according to an amount of information to be formed between frames of the silver halide roll film.

9. The camera according to claim 1, wherein the optical printer comprises a line printer having a line head made by arranging light emitting parts linearly in one line or a plurality of lines in a main scanning direction at the time of printing.

10. The camera according to claim 9, further comprising a sub-scanning direction moving device which moves the line head in a sub-scanning direction.

11. The camera according to claim 9, further comprising a main scanning direction moving device which moves the line head in the main scanning direction.

12. The camera according to claim 1, wherein the optical printer comprises a white light source and a color separation filter.

13. The camera according to claim 12, further comprising a filter switching mechanism which moves the color separation filter in the direction of carrying a photographic film.

14. The camera according to claim 1, wherein the optical printer comprises a print head made of a light emitting device and a refraction factor distribution type lens array.

15. The camera according to claim 1, further comprising a control part which grasps remaining film length of the photographic film and controls the film carrying device so that the film is rewound in the case where the remaining film length is shorter than a given length.

16. The camera according to claim 1, further comprising a communication device, wherein transmission and reception of data can be performed with an external apparatus.

17. The camera according to claim 1, further comprising an exposure compensation instructing device, wherein exposure compensation becomes effective in at least one case among the time of photographing, the time of writing of image data in the storage device, and the time of recording on the photographic film.

18. The camera according to claim 1, further comprising:
   an information acquiring device which acquires sensitivity information of a photographic film; and
   an exposure adjusting device which adjusts exposure by the optical printer according to sensitivity information acquired by the information acquiring device.

* * * * *